US011255277B2

(12) United States Patent
Becker

(10) Patent No.: US 11,255,277 B2
(45) Date of Patent: Feb. 22, 2022

(54) FUEL EXCHANGE SYSTEM AND FUEL SUPPLY SYSTEM FOR FUEL SYSTEMS

(71) Applicant: BEFINAL GMBH, Herne (DE)

(72) Inventor: Holger Becker, Herne (DE)

(73) Assignee: BEFINAL GMBH, Herne (DE)

( * ) Notice: Subject to any disclaimer, the term of this patent is extended or adjusted under 35 U.S.C. 154(b) by 0 days.

(21) Appl. No.: 17/011,198

(22) Filed: Sep. 3, 2020

(65) Prior Publication Data

US 2020/0400083 A1 Dec. 24, 2020

Related U.S. Application Data

(62) Division of application No. 16/090,873, filed as application No. PCT/EP2017/058158 on Apr. 5, 2017, now Pat. No. 10,774,755.

(30) Foreign Application Priority Data

Apr. 5, 2016 (WO) .................. PCT/EP2016/057443

(51) Int. Cl.
  *F02D 19/06* (2006.01)
  *F02M 21/02* (2006.01)
(52) U.S. Cl.
  CPC ..... *F02D 19/0647* (2013.01); *F02D 19/0613* (2013.01); *F02D 19/0665* (2013.01);
  (Continued)
(58) Field of Classification Search
  CPC ............. F02D 19/0647; F02D 19/0613; F02D 19/0665; F02D 19/0678; F02D 19/0681;
  (Continued)

(56) References Cited

U.S. PATENT DOCUMENTS 3,022,425 A 2/1962 Rockstead
4,244,553 A 1/1981 Escobosa
(Continued)

FOREIGN PATENT DOCUMENTS

CA    2 842 729      4/2014
DE  10 2008 043 930    6/2010
(Continued)

OTHER PUBLICATIONS

English translation of Japanese Office Action dated Mar. 9, 2021, Application No. 2018-552664, 3 pages.
(Continued)

*Primary Examiner* — Mahmoud Gimie
(74) *Attorney, Agent, or Firm* — Rankin, Hill & Clark LLP

(57) ABSTRACT

A system for exchanging of different fuels that can be used for operation of an engine. The system includes a fuel exchange unit, a control and an exchange return conduit. The fuel exchange unit is configured to deliver a first fuel at pressure into the injections system given a switched-off engine, in order to replace a second fuel, which is located in the injection system, with the first fuel. A fuel delivery system includes a media converter which includes a deflectable element. The media converter is driven by a drive unit via the fluid by way of the fluid being able to be led at a varying pressure to the media transformer via a first feed conduit, and is configured to deliver the fuel via a pumping effect.

19 Claims, 6 Drawing Sheets

(52) U.S. Cl.
CPC ..... *F02D 19/0678* (2013.01); *F02D 19/0681* (2013.01); *F02D 19/0684* (2013.01); *F02D 19/0689* (2013.01); *F02D 19/0694* (2013.01); *F02M 21/0212* (2013.01); *F02M 21/0215* (2013.01); *F02M 21/0221* (2013.01); *F02M 21/0239* (2013.01); *F02M 21/0242* (2013.01); *F02M 21/0245* (2013.01); *F02M 21/0287* (2013.01)

(58) Field of Classification Search
CPC ............ F02D 19/0684; F02D 19/0689; F02D 19/0694; F02M 21/0212; F02M 21/0215; F02M 21/0221; F02M 21/0239; F02M 21/0242; F02M 21/0245; F02M 21/0287
USPC .............................. 123/495, 27 GE, 525, 526
See application file for complete search history.

(56) References Cited

U.S. PATENT DOCUMENTS

| | | | | |
|---|---|---|---|---|
| 4,459,959 | A | * | 7/1984 | Terada .................. F02M 59/105 123/446 |
| 5,456,233 | A | * | 10/1995 | Felhofer .............. F02M 55/025 123/447 |
| 5,740,782 | A | | 4/1998 | Lowi, Jr. |
| 5,996,558 | A | | 12/1999 | Ouellette et al. |
| 6,067,946 | A | | 5/2000 | Bunker et al. |
| 6,073,862 | A | | 6/2000 | Touchette et al. |
| 6,205,978 | B1 | * | 3/2001 | Zoeller .............. F02M 63/0007 123/456 |
| 6,298,833 | B1 | | 10/2001 | Douville et al. |
| 6,336,598 | B1 | | 1/2002 | Touchette et al. |
| 6,532,938 | B1 | * | 3/2003 | Mahr .................... F02M 45/04 123/447 |
| 8,590,510 | B2 | | 11/2013 | Sumilla et al. |
| 9,458,805 | B2 | | 10/2016 | Haas et al. |
| 2010/0126468 | A1 | | 5/2010 | Martin |
| 2010/0282211 | A1 | * | 11/2010 | Daniel .............. F02M 37/0052 123/447 |
| 2011/0011369 | A1 | | 1/2011 | Jaasma et al. |
| 2011/0155102 | A1 | | 6/2011 | Broeke |
| 2014/0116523 | A1 | | 5/2014 | Puckett et al. |
| 2015/0226378 | A1 | | 8/2015 | Takase et al. |

FOREIGN PATENT DOCUMENTS

| | | | |
|---|---|---|---|
| EP | 2 143 916 | | 1/2010 |
| EP | 2143916 A1 | * 1/2010 | ......... F02D 19/0681 |
| JP | 57-90237 | | 6/1982 |
| JP | 57-168746 | | 10/1982 |
| JP | 62255567 A | * 11/1987 | |
| JP | 10-299601 | | 11/1998 |
| JP | 2007-154797 | | 6/2007 |
| WO | 2009/110792 | | 9/2009 |
| WO | 2011/059316 | | 5/2011 |
| WO | 2011/130791 | | 10/2011 |
| WO | 2013/087263 | | 6/2013 |
| WO | 2013/115645 | | 8/2013 |
| WO | 2013/167753 | | 11/2013 |

OTHER PUBLICATIONS

English translation of International Preliminary Report on Patentability dated Oct. 9, 2018 (Oct. 9, 2018), Application No. PCT/EP2017/058158, 12 pages.

* cited by examiner

FUEL EXCHANGE SYSTEM AND FUEL SUPPLY SYSTEM FOR FUEL SYSTEMS

CROSS REFERENCE TO RELATED APPLICATIONS

This application is a divisional application of U.S. application Ser. No. 16/090,873 filed Oct. 3, 2018, which itself is a national stage filing of PCT/EP2017/058158 filed Apr. 5, 2017 and claims priority to PCT/EP2016/057443 filed Apr. 5, 2016, all of which are expressly incorporated herein by reference.

BACKGROUND OF THE INVENTION

Field of the Invention

The invention relates to the field of fuel facilities for engines, in particular for combustions engines that can be retrofitted for operation with two (bi-fuel) or more different fuels, for example combustion motors with the direct injection of fuel.

Fuel facilities that supply a combustion engine with a liquid fuel, such as petrol (US: gasoline), as well as with a liquefied gas such as liquefied petroleum gas (LPG), and possibly additionally with a third fuel, are known. Such a fuel facility is taught for example in DE 10 2008 043 930 A1.

Although combustion engines that are supplied with different fuels by a fuel facility usually operate in a reliable manner in normal operation, it is particularly the evaporation of liquefied gas in the fuel facility or in an injection system of the combustion engine that can cause problems, particularly on starting, if the combustion engines have been operated with a fuel having a low evaporation temperature before their being switched off.

A bi-fuel fuel facility, concerning which this problem is alleviated by way of the use of an auxiliary pump, which pumps liquid fuel out of a respective tank, under pressure, into the fuel facility, is disclosed in WO 2013/115645 A1.

WO 2011/059316 A1 discloses a bi-fuel fuel facility, concerning which, if needed, fuel and in particular fuel vapours can be discharged via a component, which is located between a high-pressure pump, which is used for both fuels, and the combustion engine.

A bi-fuel fuel facility that includes a first supply line for liquid fuel and a second supply line for liquefied gas is disclosed in WO 2013/167753 A1. The two supply lines run independently of one another up to a node point. The first supply line includes a fuel high-pressure pump. The second supply line includes an auxiliary pump and is configured such that an evaporation of the liquefied gas can be prevented.

Apart from the avoidance of problems that originate from the evaporation of the liquefied gas, there exists a further potential for improvement on converting a fuel facility of a combustion engine to bi-fuel operation. The energy consumption, which is particularly high when using additional pumps, delivery volumes, pressures or control systems, which are not matched to the liquefied gas, the number of necessary components, the assembly and service effort, but also compatibility problems and universality are all fields, which can be improved.

SUMMARY OF THE INVENTION

It is an object of the invention to provide systems, which, in particular, can be applied in fuel facility of engines, the engines being able to be operated with two or more fuels, wherein such systems overcome disadvantages of the state of the art.

In particular, it is an object of the invention to provide a system that permits the exchange of a fuel in a part-region of a fuel facility and/or in a part-region of an engine, with another fuel, in an efficient and energy-saving manner.

It is further an object of the invention to provide a system, with which different fuels can be delivered in a fuel facility in an efficient manner and in a manner that is adapted to the fuels or to the engine.

It is further an object of the invention to provide a fuel facility for engines, the engines being able to be operated with two or more fuels, wherein, depending on the application and the field of use, the fuel facility includes a system according to the invention for the exchange of a fuel with another fuel, a system according to the invention for delivering the fuels or both systems.

A first aspect of the invention relates to a system for the exchange of different fuels that can be used for operation of an engine. The engines, in whose fuel facilities or on whose injection systems the system according to the first aspect is applied, in particular are internal combustion engines, such as for example combustion motors. The engine or the associated fuel facilities is herein designed to operate with at least two different fuels. For this, the fuel facility includes a first fuel container for a first fuel, a second fuel container for a second fuel, at least one fuel high-pressure pump, a pressure regulator and a conduit system. The engine further includes an injection system (also called common rail) and a pressure sensor. The conduit system is configured to lead each fuel to an inlet of one of the at least one fuel high-pressure pump and from an outlet of this fuel high-pressure pump to the injection system. Finally, the engine includes means, in order to permit a switch-over between the fuels for the operation of the engine.

The fuel facilities or the injection systems, concerning which the systems according to the invention are applied, in particular supply engines having a direct fuel injection, with fuel.

The terms arranged upstream and arranged downstream are used hereinafter, in order to specify the relative position of components of the systems and/or of the engine. These terms are based on the flow of a fuel from its fuel container to the injection facility. Accordingly, for example the fuel container of a fuel is arranged upstream of the fuel high-pressure pump, to which the mentioned fuel is led via the conduit system. The injection system is then arranged downstream of the fuel high-pressure pump.

A system according to the first aspect of the invention serves for the exchange of different fuels, the different fuels being able to be used for operation of an engine, in particular an engine of the just described type. The system is configured to be connectable, via a connection, onto a high-pressure region of a fuel facility (hereinafter called high-pressure-side connection of the system), the fuel facility supplying the engine with fuel, and/or onto an injection system of the engine. Herein, high-pressure region denotes those regions of the fuel facility that are arranged downstream of a fuel high-pressure pump.

For example, the system can be connectable between a fuel high-pressure pump and the injection system of the engine.

However, it is also possible for the system or parts thereof to be connectable directly onto the injection system of the engine, for example via a separate inlet and possibly via a separate outlet, on the injection system, A system according to the first aspect of the invention includes a fuel exchange unit, a control and an exchange return conduit. The control is configured to discharge the second fuel out of the injection system via the exchange return conduit. Furthermore, the fuel exchange unit is configured to deliver a first fuel under pressure into the injection system via the high-pressure-side connection given a switched-off engine, in order to replace a second fuel, which is usable for operation of the engine and which is located in the injection system, by the first fuel.

In other words: the fuel exchange unit is capable of delivering the first fuel under pressure into the injection system via the high-pressure-side connection, in order to replace the second fuel, which is useable for the operation of the engine and which is located in the injection system, by the first fuel, even if the combustion engine itself is switched off. In particular, this means that no component of the engine needs to actively participate given the mentioned fuel exchange, or that the system is configured to autonomously carry out all necessary steps for the fuel exchange.

Supplementarily, the system can include further high-pressure-side or low-pressure-side connections, which are configured to connect the system onto the fuel facility and/or the engine, in particular the injection system. The system can furthermore be an integral constituent of the fuel facility and/or the injection system, as well as assembled at a later stage.

In particular, the system is configured to be arranged between an outlet of the fuel high-pressure pump, which brings the first fuel to an operating pressure that is necessary for the operation of the engine, and the injection system or rather the rail. This means that the system, via the high-pressure-side connection, is in connection with that section of the conduit system of the fuel facility of the engine, which is located between the fuel high-pressure pump of the first fuel, or rather the mentioned outlet of the pressure regulator of the fuel high-pressure pump, and the injection system. This does not exclude the presence of further components of the fuel facility that are arranged upstream or downstream, as well as a connection of the system onto parts of the conduit system that are not located downstream of the mentioned fuel high-pressure pump.

Alternatively, also only a part of the system can be connected onto the mentioned section of the conduit system of the fuel facility, while another part, for example the fuel exchange unit, is connected directly to the injection system, or rather to the common rail.

Moreover, it is possible for all high-pressure-side connections of the system to be connected directly to the injection system, in particular to the common rail.

In an embodiment, the fuel exchange unit includes a pressure accumulator, which is configured to store the first fuel under pressure.

The pressure, at which the first fuel is stored in the pressure accumulator, in particular corresponds to the operating pressure of this fuel (also called system pressure or fuel pressure). The mentioned pressure is consequently in the regulating (closed-loop control) range of the operating pressure of the engine, in which the system is applied.

If the engine is a petrol-driven (US: gas-driven) combustion motor, then the mentioned pressure is between 20 and 400 bar. Concerning most petrol-driven combustion motors of the current generation, the regulating range of the operating pressure and therefore the pressure, at which the petrol is storable in the pressure accumulator, is between 30 and 300 bar, wherein petrol-operated combustion motors of the middle and lower price category have a regulating range between 30 bar (on ticking over) and 180 bar (on accelerating). In the case of a petrol-driven combustion motor, the pressure, at which the first fuel is storable in the pressure accumulator, is consequently between 20 bar and 400 bar, in particular between 30 bar and 300 bar or between 40 bar and 180 bar.

In the case that the engine is a diesel-operated combustion motor, then the pressure, at which the first fuel is storable in the pressure accumulator, can be 2300 bar or more. The regulating range of the operating pressure in the case of diesel-operated combustion motors which are currently obtainable on the market lies between about 150 and 2300 bar.

In the case that the engine includes additional elements that have an influence upon the regulating range of the operating pressure of the first fuel, such as for example a turbo or a compressor, the pressure range, at which the first fuel is storable in the pressure accumulator can change accordingly.

It is of course to be understood that the pressure, at which the petrol is storable in the pressure accumulator, can also be outside the mentioned limit values, should the trend towards combustion motors or injection systems with even higher operating pressures continue. This is the case independently of the aspect of the invention and is also to be applied to the volumes mentioned hereinafter, in particular delivery volumes and exchange volumes.

The use of a pressure buffer, in particular of a gas such as, for example, nitrogen, in the pressure accumulator, can serve for storing the first fuel at a pressure in the previously mentioned range.

In the mentioned embodiment, the system can further include a pressure accumulator valve, which, on filling the pressure accumulator, is arranged upstream of the pressure accumulator and which by way of the control is switchable between an open and a closed state. In the opened state, the pressure accumulator is in contact with the high-pressure region of the fuel facility or with the injection system or rather its common rail, via the high-pressure side connection. In the closed state, the pressure accumulator is separated from the high-pressure region and the injection system.

Furthermore, the system can be configured for a slow, for example continuous filling of the pressure accumulator and a rapid, in particular abrupt emptying. For this, the system can include a check valve with a bore, between the pressure accumulator and the high-pressure-side connection. The bore, for example, can be a bore in the check ball or in the check plate of the check valve.

Other embodiments for the slow filling and rapid emptying of the pressure accumulator are likewise conceivable. Such embodiments can include a bypass bore for example.

The check valve with a bore, or rather the element for the slow filling and rapid emptying of the pressure accumulator, is particularly applied in combination with the pressure accumulator valve. The mentioned check valve or rather the mentioned element, and the pressure accumulator valve can be part of the fuel exchange unit.

Of course, it is to be understood that the valves as a rule have orifices (generally a restriction of the cross section or, in a more specific embodiment, an orifice plate), in order to carry out the pressure and pressure-flow adaptations/adjustments. It is for this reason that this is mostly not explicitly mentioned hereinafter.

The system can be designed such that the pressure accumulator is fillable with the first fuel during the operation of the engine. Herein, the system in particular can be designed such that the first fuel is stored in the pressure accumulator at operating pressure.

In particular, the pressure accumulator can be fillable by way of the first fuel being branched off in the direction of the pressure accumulator during the operation of the engine with the first fuel. Herein, the branched-off flow rate can be selected such that the operation of the engine is not compromised. It has been found that branched-off flow rates that lead to a filling of the pressure accumulator in the range of a few seconds up to a few minutes, in particular in the range between half a minute and a minute, can be suitable.

The system can further be configured for it to permit a repeated discharge/filling.

The pressure accumulator valve can be controllable via the control, in order to regulate the filling procedure for filling the pressure accumulator. Herein, the regulation (closed-loop control) of the pressure accumulator valve can be dependent on the operating parameters of the fuel facility, for example the operating state of the injection system, the applied fuel or system pressures, in particular on the operating pressure in the injection facility. The regulation of the pressure accumulator valve can further be temperature-controlled and/or time-controlled.

The filling of the pressure accumulator can alternatively be effected via a separate conduit. This includes a check valve, possibly with an orifice and for its part has a high-pressure-side connection onto the high-pressure region of the fuel facility or onto the injection system. In this alternative embodiment for filling the pressure accumulator, the pressure accumulator valve is closed during the filling procedure. In this embodiment, the valve merely serves for discharging the first fuel which is stored in the pressure accumulator.

In an embodiment, the fuel exchange unit includes a boost pump that is activatable and operable independently of the operating state of the engine. The boost pump has a boost pump inlet, via which the feed of the first fuel is ensured, and a boost pump outlet, which is connected via the high-pressure-side connection of the system to the high-pressure region of the fuel facility and/or to the injection system.

In particular, the boost pump can be a pump that is designed to deliver a quantity of first fuel, which is just about sufficient for the filling of the injection system with first fuel given a switched-off engine, at a pressure that is reduced compared to the system pressure. Its drive can be effected, for example, via a battery, which is charged on operation of the engine.

The filling quantity and the pressure depend, for example, on the engine, the injection system and at least on the applied first fuel. For example, in the case of a four-cylinder combustion motor with a direct injection of fuel and operation with petrol (first fuel) and LPG (second fuel), after the discharge of the LPG, it can be sufficient to deliver a few hundred millilitres of petrol at approximately 20-30 bar, in order to ensure an unproblematic starting of the combustion motor. In particular, as a rule, delivery quantities of between 200 and 500 ml are sufficient.

The fuel exchange unit can include a reservoir for the first fuel, in order to be able to deliver the necessary quantity of first fuel, wherein this reservoir is connected to the boost pump inlet.

In particular, the reservoir can be the first fuel container, a container that is different from this or a conduit region. The reservoir is advantageously filled with the first fuel during the operation of the engine, or for example the boost pump accesses the first fuel container via a separate inlet, so that one can make do without an activation of the fuel delivery pump of the first fuel container given an engine that is switched off.

Supplementarily, the fuel exchange unit with the boost pump can include a pressure accumulator of the already mentioned type. This pressure accumulator is arranged downstream of the boost pump and as mentioned can store the first fuel under pressure.

However, a pressure accumulator, which is used in combination with a boost pump, can have a smaller filling volume than a separately applied pressure accumulator.

In particular, the pressure accumulator can be configured to increase the pressure of the first fuel which has flowed out of the boost pump outlet into the injection system, or rather into the rail. For this, further first fuel is discharged out of the pressure accumulator in the direction of the injection system under pressure, in particular at a pressure that is greater than the pressure of the first fuel that flows out of the boost pump.

For example, the boost pump can be designed to introduce the first fuel into the injection system at approximately 20 bar. The discharge of the first fuel that is stored in the pressure accumulator can then increase the pressure that prevails in the injection system or rather the rail, to above 40 bar.

In an embodiment, the second fuel, which is located in the injection system and can be discharged out of this via the exchange return conduit, is discharged into a storage container or into the second fuel container.

The system can include a connection or a connection device to a low-pressure region of the fuel facility, in order to ensure such a discharge into the storage container or into the second fuel container. In particular, the low-pressure region has a pressure that prevails in it and that lies in a region suitable for storing the second fuel.

In the case of LPG as a second fuel, this pressure can lie, for example, in the range of 2 to 10 bar.

Supplementarily, the exchange return conduit can therefore be connected at a first side to the injection system and at a second side to the fuel container of the second fuel ("second fuel container") or to the storage container. Herein, the exchange return conduit can be connected directly onto the injection system and onto the fuel container of the second fuel or rather onto the storage container. However, it can be advantageous to connect the exchange return conduit onto the conduit system of the fuel facility and/or of the system.

Furthermore, the thus designed exchange return conduit can include a return valve. This controls the return of the second fuel via the exchange return conduit. For this, it can be switched between an open and a closed state by way of the control. In the open state, the second fuel, which is located in the injection system and in parts of the conduit system is discharged into the second fuel container. Accordingly, such a discharge is prevented in the closed state.

Supplementraily, the control can be designed to firstly discharge the second fuel, which is located in the injection system and in parts of the conduit system, into the second fuel container or into the storage container, before the first fuel is delivered into the injection system via the fuel exchange unit.

The discharge of the second fuel, apart from a pressure equalisation between the injection system and the second fuel container, can also be based on an aggregate state change from liquid to gaseous of the second fuel in the injection system. This aggregate state change can be caused by residual heat or trapped heat in the region of the injection system.

As to how long an efficient discharge of the second fuel out of the injection system into the second fuel container is possible after switching off the engine in particular depends on the engine, its operating state and control as well as on the second fuel. It has been found that at least in the case of combustion motors of vehicles, in particular passenger vehicles, and given the use of LPG as a second fuel, the second fuel can still be discharged from the injection system into the second fuel container several hours after switching off the combustion motor. In trials, such a discharge was still possible without any problem for example two hours after switching off a combustion motor, which is warm due to longer operation.

The system can be optimised for a multitude of motor types and/or motor states and/or first and second fuels, by way of a multitude of operating parameters of the system being able to be adjusted. In particular, the operating parameters are switching times, waiting times, flow rates, branched-off flow rates, or pressures, in particular the pressure, at which the first fuel is delivered out of the fuel exchange unit.

The motor types can be different with regard to the manufacturer and/or the field of application. Fields of application are, for example, passenger vehicles, lorries, agricultural vehicles, ships or aircraft, but also stationary machines with a combustion motor such as, for example, electricity generators, pumps, drives etc.

Different motor states can arise, for example, due to ageing processes, tuning or technical changes to the injection system. The latter can be carried out at the factory by the manufacturer as well as on the part of the user.

In an embodiment, the second fuel is liquefied petroleum gas, LPG.

Alternatively however, it can also be for example a compressed natural gas (CNG), liquefied gas, liquefied natural gas (LNG), or any liquid, combustible substances (biodiesel, vegetable oil, alcohol, ethanol, etc., but also mixtures of different fuels).

Supplementarily, the first fuel can be petrol, diesel or another of the previously listed combustibles which are different from the second fuel.

In an embodiment, the system is designed for the exchange of the second fuel which is located in the fuel exchange unit, in particular in the injection system, to take place by way of using the fuel exchange unit, if at least one of the following conditions is fulfilled:

The engine is no longer in operation since a predefined time interval. As mentioned, the time interval, after which the second fuel can be discharged from the injection system into the second fuel container without any problem depends on various parameters. Accordingly, the time interval, after which the exchange of the second fuel which is located in the injection system with the first fuel takes place, can depend for example on the engine, its operating state and control, as well on as the second fuel.

A predefined temperature change was registered in the region of the injection facility after the engine has been switched off. In particular, the temperature change is a temperature reduction.

A predefined temperature was fallen short of in the region of the injection facility or is not reached within a certain time, after the engine was switched off. In particular, the latter serves for preventing problems at very hot temperatures.

The system according to one of the previously described embodiments can be the characterising element of a fuel facility, the facility supplying an engine with different fuels. The fuel facility further includes a first fuel container for a first fuel, a second fuel container for a second fuel, at least one fuel high-pressure pump and a conduit system. Herein, each fuel container is connected to a fuel high-pressure pump via the conduit system and the at least one fuel high-pressure pump is connected to an injection system of an engine via the conduit system.

The fuel facility can be applied for example in passenger vehicles, lorries, agricultural vehicles, ships or aircraft, but also stationary machines such as electricity generators, pumps and drives.

The fuel facility or rather the system according to one of the described embodiments can characterise a drive assembly that further includes an engine.

The drive assembly, for example, is a stationary or mobile machine with a combustion motor, an electricity generator, or a drive for a device which operates in a stand-alone manner.

The drive assembly, or rather the fuel facility or the system according to one of the described embodiments can characterise a transport means. Examples of such transport means are vehicles (passenger vehicles, lorries, agricultural vehicles, vehicles for construction, etc.), ships or aircraft.

In particular, the transport means are a motorised vehicle, for example one of the previously mentioned motorised vehicles. This can be driven, for example, by a bi-fuel combustion engine that can be operated with petrol or diesel as a first fuel and with a liquid or gaseous fuel, which is different from petrol and (conventional) diesel, as a second fuel. Possible fuel combinations are, for example, petrol and liquefied petroleum gas, vegetable oil and diesel or biodiesel and diesel. However, other fuel combinations are also possible, in particular a combination of the combustibles that are not fully listed in the text.

Supplementarily, the engine which drives the motorised vehicle can be an engine with direct injection of fuel.

It is also possible for the engine to be drivable by a mixture of the first and second fuel.

A second aspect of the invention relates to a system for delivering a liquid or gaseous combustible, which is to say fuel, in a conduit system.

In particular, the system is suitable, but not only suitable, for the application in fuel facilities for engines which can be retrofitted to an operation with at least two different fuels. Examples of such engines are again combustion engines, such as combustion motors or turbines.

A fuel facility, into which the system according to the second aspect of the invention can be installed, has a drive unit before the installation of this system.

The drive unit in the context of the invention in particular is a pump for a fluid, for example a fuel high-pressure pump or an oil pump. However, it is also possible for the drive unit to be an electrical or mechanical drive.

The fuel facility can further include a fluid reservoir and a conduit system. In particular, the conduit system can be configured to lead the fluid to an inlet of the drive unit and from an outlet of this to further components of the fuel facility and/or to the engine.

The system for the delivery of a liquid or gaseous combustible includes:

A conduit system, in which a fluid and a combustible, which is different than this fluid, can be led. Herein, the conduit system can include regions, in which only the fluid or only the combustible is led, as well as regions in which the fluid and combustible can be led separately or as a mixture.

At least one media transformer (sometimes referred to as media converter), which is configured to deliver the combustible through the conduit system of the system and possibly through the conduit system of the previously described fuel facility.

A connection to a drive unit, wherein the drive unit is configured to move, in particular deliver the fluid through the conduit system of the system and of the previously described fuel facility, and wherein the connection is configured to feed the fluid to the media transformer.

The fluid can get from the drive unit to the media transformer in different ways, for example via a standard outlet or via a connection onto a compression space of the drive unit, the connection possibly yet to be manufactured.

The fluid can moreover assume the function of a hydraulic liquid, which, in particular, flows through the media transformer not from an inlet to an outlet, but for example moves to and fro in a pressure conduit between the drive unit and the media transformer.

Supplementarily, a switch-over valve which, is integrated into the conduit system of the system or of the fuel facility, can be configured to feed the fluid to the media transformer as a whole, partially or not at all. This is of particular significance if the fluid within the fluid facility and/or the engine assumes a further function which is different from the drive of the media transformer, e.g. as a fuel or lubricant. For example, the system and the switch-over valve can be designed such that one can switch between a supply of the engine with fluid and combustible at all times and briefly, even amid full load of the engine—assuming the engine can be operated by the fluid.

The system according to the second aspect of the invention is characterised in that the media transformer includes a deflectable element. In particular, "deflectable" means that the element is laterally displaceable and/or that at least a part-region of the element is deformable such that the part-region can assume different spatial positions.

In an embodiment, the deflectable element is a deflectable separating element which in the media transformer separates the fluid from the combustible.

In an embodiment, the deflectable element is a membrane which is fastened in/on a surrounding wall the media transformer, or a piston which is mounted in a guidable manner.

The system according to the second aspect is further characterised in that the media transformer includes a first volume for the fluid, a second volume for the combustible and a first feed conduit, via which the fluid can flow into the first volume, wherein the fluid, which flows into the first volume has a pressure that varies in dependence on time, and that the media transformer is configured to convert the fluid, which varies in pressure, into a deflection of the deflectable element such that a pumping effect upon the combustible arises.

The temporal course of the pumping effect (and thus of the delivery effect) of the media transformer can be identical to the temporal course of the pressure of the fluid, which flows into the media transformer.

The temporal course of the pumping effect of the media transformer is particularly suitable for the supply of an engine with combustible.

The media transformer of the system according to the second aspect of the invention can be driven by the fluid, which is fed via the connection. In particular, the media transformer is configured such that it can obtain the complete energy requirement that is necessary for delivering the combustible, from the fluid, which is fed via the connection.

In an embodiment, the drive unit itself subjects the fluid to the temporally varying pressure, at which the fluid flows into the media transformer via the first feed conduit. This, for example, is the case if the drive unit is a fuel high-pressure pump.

In a further embodiment, at least one control valve, which is at the feed conduit side (feed-conduit-side control valve), and at least one discharge-conduit-side controllable valve ensure that the fluid, which flows into the media transformer via the first feed conduit, has a pressure which varies. This embodiment is particularly applied if the drive unit is a pump, which subjects the fluid to a constant pressure or to a pressure, whose temporal variation is unsuitable for the supply of the media transformer and/or of the engine with combustible. Oil pumps are an example of such pumps. Moreover, these embodiments can be applied if one or more media transformers are not to operate at the cycle of the drive unit.

A system according to this alternative embodiment can further include a control which controls the interaction of the different valves. In particular, the control can ensure that the temporal course of the pressure of the fluid which flows into the media transformer leads to a pumping effect upon the fuel, the pumping effect being suitable for the supply of an engine with combustible.

In an embodiment, the system can be incorporated into a fuel facility that supplies an engine that is operable with different fuels, with fuel. In this embodiment, a first fuel, which is suitable for the operation of the engine, can additionally act as the previously described fluid, wherein a second fuel, which is suitable for the operation of the engine, is the previously described combustible.

In particular, the first and the second fuel are the first and the second fuel according to the first aspect of the invention.

In an embodiment, the deflectable element separates the first volume from the second volume in a liquid-tight and/or gas-tight way and manner.

Supplementarily, apart from the first feed conduit, the media transformer can include a first discharge conduit (a first feed conduit/discharge conduit pair) as well as a second feed conduit and a second discharge conduit (a second feed conduit/discharge conduit pair), wherein the first feed conduit/discharge conduit pair is connected to the first volume and the second feed conduit/discharge conduit pair to the second volume.

In this context, "is connected" means that the fluid or the combustible can flow from the feed conduit/discharge conduit into the respective volume and from the volume into the respective feed conduit/discharge conduit. Additional components such as valves or orifices can be integrated, in order to control the flows of fluid and combustible and possibly to prevent these in one or both directions.

In particular, the system can be configured to the extent that the fluid can be brought into the first volume via the first feed conduit and the combustible into the second volume via the second feed conduit. Herein, the fluid in the first volume is at a first pressure and the combustible in the second volume at a second pressure. Furthermore, the media transformer can be configured to use a pressure difference between the first pressure and the second pressure for deflecting the deflectable element and for delivering the combustible in the conduit system and/or for a change of the second pressure.

In particular, it is the drive unit which subjects the fluid to pressure, such that this is at the mentioned first pressure in the first volume.

The delivery of the combustible in the conduit system and/or the change of the second pressure in particular are based on a change of the second volume which is caused by the temporal variation of the first pressure. Herein, in particular, the change of the second volume is the consequence of a deflection of the membrane or a displacement of the position of the piston.

Apart from the delivery of a liquid or gaseous combustible, the system can also be applied as a pressure transformer and/or delivery rate transformer. In particular, the different functions result from the construction manner of the media transformer as well as from the design of a control which controls the media transformer as well as valves which are incorporated in the conduit system, and possibly the drive unit. Herein, it is particularly the activation times and the dimensions of the media transformer which are of significance.

In an embodiment, the first volume of the media transformer is given by a first profile perpendicular to a first deflecting direction of the deflectable element as well as to a first spatial extension parallel to the first deflecting direction. Analogously, the second volume of the media transformer is given by a second profile perpendicular to a second deflecting direction of the deflectable element as well as to a second spatial extension parallel to the second deflecting direction. Herein, the first deflecting direction corresponds to the deflecting direction of the deflectable element in the region of the first volume and the second deflecting direction to the deflecting direction of the deflectable element in the region of the second volume.

Furthermore, towards the first volume, the deflectable element includes a first end-face and towards the second volume a second end-face, wherein the first end-face has the first profile and the second end-face the second profile.

The first and the second profile can now be configured such that the system can be operated as a pressure transformer and/or delivery rate transformer. For this, the surface ratio between the first and the second end-face or between the first and the second profile is selected such that the second pressure is greater than the first pressure (ratio larger than 1), or that the second pressure is lower than the first pressure (ratio smaller than 1).

The delivery rate of the combustible can be increased analogously (surface ratio between the first and the second profile smaller than 1) or reduced (ratio greater than 1).

In particular, these pressure transformer and/or delivery rate transformer characteristics are matched to the selected drive unit and to the operated engine. For example, on using an oil pump as a drive unit, it can be necessary to increase the second pressure. On the other hand, on installation or incorporation of the system according to the second aspect into a fuel facility for a bi-fuel combustion motor, on using the fuel high-pressure pump of the first fuel (e.g. petrol), it can be necessary to increase the volume of the second fuel (e.g. LPG) which is delivered by the system.

If for example a bi-fuel engine is operated with LPG (combustible) and petrol (fluid), then given the combustion process in LPG operation of the engine, a fuel volume quantity that is increased by about 20% is required in comparison with the operation of the engine with petrol. This increased demand can be covered by the operation of the system as a pressure transformer and/or delivery rate transformer as described above.

The system can include an additional pre-compression pump, in order to compensate a pressure reduction which is entailed by the increase of the delivery rate. In particular, this pre-compression pump is arranged upstream of the second feed conduit (i.e. of the inlet into the second volume).

Alternatively, the delivery pressure, which is generated by a combustible delivery pump, which is applied for delivering the combustible from a combustible container, can be increased.

In both cases, the system can be configured such that the pressure difference, which is produced by the media transformer, and the pressure difference, which is produced by the additional pre-compression pump or by the combustible delivery pump, essentially sum.

In embodiments, the first pressure is at least temporarily greater than the second pressure and the pressure difference between the first and the second pressure, via a reduction of the second volume, leads to the outflow of the combustible out of the second volume and/or to the second pressure increasing.

In an embodiment, the drive unit is the fuel high-pressure pump of the first fuel, wherein the fuel high-pressure pump is driven via a camshaft. The first pressure has repeating pressure peaks due to this.

It is particularly these pressure peaks which lead to the first pressure being at least temporarily greater than the second pressure. However, the first pressure can also overall be greater than the second pressure.

Combustible can periodically flow into and out of the second volume due to the temporal course of the first pressure which has repeating pressure peaks and pressure minima. Herein, the outflow takes place via the second discharge conduit, in particular in the direction of the injection system or rather rail, of the engine, in whose fuel facility the system is installed. The inflow is effected via the second feed conduit, which is connected, for example, to a combustible container for the combustible.

The system additionally includes one or more of the following elements, depending on how the fuel facility, into which the system according to the second aspect of the invention is installed, is designed:
A return that connects the first discharge conduit of the media transformer to an inlet of the drive unit and/or to a fluid reservoir, which as a rule is part of the initial fuel facility, for the storage of the fluid.
A controllable valve that regulates the flow of the fluid via the return, wherein the controllable valve can be the already described discharge-conduit-side controllable valve.
A combustible container for storing the liquid or gaseous combustible, the fuel container being connected to the media transformer via the second feed conduit. The combustible container can further include a combustible delivery pump for delivering the combustible from the combustible container into the conduit system or into the second volume.
A fuel facility return conduit, which connects the second feed conduit to the combustible container.
A feed-conduit-side check valve, which prevents combustible from flowing out the media transformer in the direction of the combustible container via the second feed conduit.

An aperture or a pressure regulator, which ensures that excess combustible, which is located in the inlet region of the media transformer, is led back into the combustible container via the fuel facility return conduit. The aperture or rather the pressure regulator, and the fuel facility return conduit further ensure a return of combustible given cavitation in the inlet region of the media transformer.

As to which of the aforementioned elements the system includes depends, for example, on whether the fuel facility, into which the system can be installed, already transports a fluid and a combustible, or rather a first fuel and a second fuel. This also means that the system can include more or less elements depending on whether it is used for converting a fuel facility, for retrofitting a fuel facility, or for setting up for the first time by the manufacturer.

In embodiments, in which the system can be incorporated into a fuel facility for the operation of an engine, which can be operated with two or more fuels, and in which a first fuel additionally acts as a fluid, analogous elements for the fluid and the first fuel, or rather for the combustible and the second fuel, result in an obvious manner. Thus, for example, in these embodiments, the fluid reservoir can be identical to the first fuel container and the combustible container can be identical to the second fuel container.

In such embodiments, the mentioned switch-over valve is configured to control the feed of the first fuel (fluid), on the one hand to the media transformer and on the other hand to the injection system. The switch-over valve can be realised as a 3/2-way valve for this.

In an embodiment, the system includes at least two, for example 2, 3, 4, 5 or more media transformers that interact such that one or more characteristic values, which are characteristic of the delivery of the combustible, are changeable. The characteristic values for example are the temporal course of the pressure and/or of the delivery rate, in particular the cycling of occurring pressure and/or delivery rate maxima. Further characteristic values are for example the maximum pressure, at which the combustible is delivered through the media transformers, or the delivery rate per unit of time or delivery cycle.

In an embodiment, the system includes two media transformers that are connected in parallel and operate asynchronously to one another. This means that the respective one deflectable element of the media transformers do not move in phase with one another. The deflectable elements of the media transformers, in particular, can move oppositely to one another.

If the system includes two media transformers, then the deflectable element of a first media transformer in particular moves oppositely to the deflectable element of a second media transformer.

Two media transformers, which operate in opposite directions, can also be realised by a hydraulic block, which includes a first block part, a second block part and a third block part.

In an embodiment, the first and the second block part each include two chambers (hereinafter called left and right chamber of the first and second block part respectively), which are separated in each case by a part-region of the deflectable element.

In particular, the deflectable element includes a first piston, a second piston and a piston connection. The piston connection forms a rigid connection between the first and the second piston. This means that a movement of the first piston leads to an equally directed movement of the second piston and vice versa.

The first piston separates the left chamber of the first block part from the right chamber of the first block part and the second piston separates the left chamber of the second block part from the right chamber of the second block part.

The third block part separates the first block part from the second block part. In particular, it separates the left chamber of the first block part from the right chamber of the second block part.

Furthermore, the third block part can form a guide for the piston connection along a longitudinal axis of the hydraulic block. In this case, the equally directed movement of the first and of the second piston corresponds to an equally directed movement along this longitudinal axis.

In this embodiment, the left chamber of the first block part corresponds to the first volume of a first media transformer, the right chamber of the second block part to the second volume of the first media transformer, the right chamber of the first block part to the first volume of a second media transformer and the left chamber of the second block part to the second volume of the second media transformer. Accordingly, a block part can be configured for the fluid and a block part for the combustible.

Each of the four chambers can each include a feed conduit and a discharge conduit, wherein the feed conduits to the two chambers of the first block part include a common or each a first chamber feed conduit valve and the discharge conduits of the two chambers of the first block part include a common or each a first chamber discharge conduit valve.

The common chamber feed conduit valve or the common chamber discharge conduit valve can be a 3/2-way valve, in particular a 3/2-way magnet valve.

The system can include a sensor, which is arranged such that it can determine a certain, for example, extremal deflection of the deflectable element, independently of whether the system for the delivery of the combustible has one or several, for example two media transformers.

The sensor can be for example a reed contact, Hall sensor or the like

The switching of the first chamber feed conduit valve or of the first chamber feed conduit valves and/or of the first chamber discharge conduit valve or of the first chamber discharge conduit valves can be activated in a direct manner or via the control by way of the mentioned sensor.

The media transformer can heat up to a greater or lesser extent depending on the arrangement of the system relative to the engine. This heating is due, for example, to the entry of heat by way of fluid (for example petrol), which is heated in and/or on the motor.

The heating up of the media transformer can have a negative effect on the operation of this. For example, such a heating can increase the vapour pressure in the second volume to such an extent that this exceeds the delivery pressure of the combustible, which can prevent an adequate post-flow of combustible into the media transformer and therefore an adequate supply of the engine with the second combustible.

A surrounding wall of the media transformer can include at least one cooling bore, in order to prevent too high a heating of the media transformer. The surrounding wall can be for example a surrounding wall of the hydraulic block and or a surrounding wall of at least one of the three block parts.

The cooling bore can be supplied via a bypass valve and an aperture and/or a nozzle.

The aperture and/or the nozzle have the effect that the (liquid) combustible is at a greater pressure upstream of the aperture/nozzle, which is to say upstream of the entry into the cooling bore, than downstream of the aperture/nozzle.

The combustible can evaporate within the cooling bore on account of this and remove heat from the surrounding wall, by which means the media transformer is cooled.

The cooling bore can be designed in a tunnel-like manner and extend over a region of the surrounding wall.

An outlet of the channel bore can be connected to the combustible container such that returning combustible is fed to the combustible container.

In particular, the at least one cooling bore is arranged such that the combustible-part of the media transformer is cooled.

The cooling performance/power can be regulated by the aperture and/or nozzle, in particular by way of a regulation of the quantity of combustible that flows through the aperture and/or nozzle.

Bores of fastening screws, as are also applied for the retention of different parts of the media transformer, can be used for the cooling bores.

The various parts can include for example a fluid-part and the combustible part. In particular, they can include the aforementioned three block parts of the hydraulic block.

The bores can be enlarged, which is to say widened and/or lengthened.

The bores can include a thread.

The presence of a thread as well as an enlargement of the bore leads to a surface enlargement of the cooling bore and therefore to an increased heat absorption of the (gaseous) combustible.

An additional third media transformer can be configured, for example, to bridge power drops, which occur on switching between the first and second media transformer.

Alternatively, pressure declines that arise on switching over the delivery direction can be prevented or at least reduced by way of one of the following measures:

The system additionally includes an equalisation pressure accumulator, which is connected downstream of the media transformer and upstream of the injection system. In particular, the equalisation pressure accumulator can be arranged such that it is fillable with combustible at a high pressure as well as with fluid at a high pressure.

It is particular with systems with two media transformers operating in opposite directions that the feed-conduit-side and discharge-conduit-side valves, which regulate the inflow and outflow of the fluid into and out of the media transformer, can be switched such that concerning the media transformer with the deflected element, the fluid feed conduit as well as the fluid discharge conduit is briefly closed.

In systems which further include the pressure accumulator according to the first aspect of the invention, the pressure drops can also be prevented or at least reduced via the discharge of fluid or combustible, which is stored in the pressure accumulator.

The reduction or prevention of such pressure declines (pressure drops) in particular solves the problem of a possibly present engine control, in particular the engine control in the case of vehicles, from indicating a system error when a system according to the second aspect of the invention in any embodiment is installed into a drive assembly, in particular into the drive assembly of a vehicle.

The system can further include a control that controls one or more valves of the system and possibly interacts with an engine-side control, via which as a rule the initial fuel facility is controlled. The control regulates, for example, the/a controllable valve and/or the/a control valve and/or the switch-over valve.

The control can include an element that is configured to determine a deflection of the deflectable element. The mentioned element can be, for example, a reed contact or a Hall sensor.

In particular, the element can determine a maximal deflection of the deflectable element and the control can be configured to switch the feed-conduit-side valves and the discharge-conduit-side valves of the media transformer such that a delivery of the combustible takes place in at least one of the described manners.

In an embodiment, the feed-conduit-side and the discharge-conduit-side valves of the media transformer are hydraulically switchable such that a delivery of the combustible takes place in at least one of the described manners. This permits a mechanical operation of the system, or a mechanical switching-over of the media transformer, by which means the number of necessary electrical components, such as for example electrically switchable valves and sensors can be reduced.

For this, mechanically biased valves, for example valves biased with a spring, can be incorporated into the wall that defines the first and the second volume.

The mechanically biased valves can be arranged and configured such that they open or close, for example, given a maximum deflection of the deflectable element.

In particular, there are two maximal deflections given a deflection along an axis. These can each be defined by a stop.

Supplementarily, the embodiment with hydraulically switchable valves can include a pressure buffer, for example in the form of an accumulator piston. The pressure buffer can be configured to combine pressure drops which occur on switching.

It is particularly in the case of systems with a double media transformer with media transformers operating in opposite directions that a pressure buffer is of interest, since the pressure drops that occur on switching the combustible delivery by the first media transformer to combustible delivery by the second media transformer and vice versa can be reduced or even eliminated by way of this.

Such pressure drops particularly occur with the embodiment with hydraulically switchable valves, since in this case the switch-over cannot be regulated by the drive unit, for example the high-pressure pump or rather the cam position.

In an embodiment, the system has an operating console and the control is configured to acquire (detect) at least one operating parameter of the system.

The acquired operating parameter can be used for determining an operating state.

The control can be configured to transfer the at least one operating parameter (or the operating state that results therefrom) to the operating console. For this, the control and the operating console include a communication module. The control and the operating console can build up a possibly wireless communication connection with one another via this communication module.

The communication modules can be Bluetooth-compatible.

The communication module of the control and/or the communication module of the operating console can further be configured to communicate with a mobile device, in particular with a mobile telephone or tablet. In this case, one or more operating parameters can be changeable via an app that is implemented on the mobile device. It is also conceivable for one, several or all subsequently described functions of the operating console to be implemented by the mobile device. In this case, one can even make do without the subsequently described operating console.

The operating console can be configured to display transmitted operating parameters (operating states) and to forward commands, which are inputted via the operating console, to the control. The forwarding of the commands can be effected via the mentioned communication connection. The operating console can include a display element, such as a screen or LEDs etc., for the display of the transmitted operating parameters (operating states).

The operating console can include input elements, such as for example a touchscreen, keys or a rotary control, via which the commands can be inputted by the user.

The control can include sensors and/or access such, for detecting or acquiring the at least one operating parameter.

The transmission of the at least one operating parameter (operating state) to the operating console and/or its display on the operating console and/or the forwarding of a command from the operating console to the control can presuppose an authorisation authentication For example, the operating console can include two console operating states. A first console operating state is directed towards a simple user, which is to say a user who has no servicing, testing and/or updating tasks. It is only the basic operating parameters (operating states) that are displayed in the first console operating state, and only basic commands can be inputted.

An operating console of the just described type can also be applied with a system according to the first aspect of the invention in any embodiment. In particular, a system according to the first aspect can include the operating console and possibly a correspondingly designed control and corresponding communication modules.

With regard to the basic operating parameters (operating states), it can be the case, for example, of a display as to whether the combustible or the fluid is momentarily delivered to an outlet of the system, or the filling level in the combustible container, in the fluid reservoir and/or in the pressure accumulator according to the first aspect of the invention.

Concerning the basic commands, these for example can be the switching-on/switching-off of the system, the initiation of a system test or the selection as to whether the combustible or the fluid is to be delivered to an outlet of the system.

A second console operating state can be designed in view of an expert user, such as, for example, a service technician. More detailed operating parameters can be displayed in the second console operating state and there can also be the possibility of accessing components of the system via the operating console.

For example, the failure of a component, the wearing of a component, but also the pressure and/or the temperature at certain locations in the system can be displayed in the second operating state.

The display of at least the more detailed operating parameters (operating states) can be effected via a reduced error code.

The display of operating parameters (operating states) can be effected in a comparatively simple manner. For example, it can be effected in the form of flashing LEDs. Concerning flashing LEDs, these can be those LEDs which are used for the display of the basic operating parameters.

For example, the operating console can include five LEDs. In this case, 120 light combinations are available for the display of operating parameters.

Such flashing LEDs are an example of a reduced error code.

The transition of the operating console from the first console operating state into the second console operating state can presuppose in particular the mentioned authorisation authentication. This, for example, can include the input or the transmission of a code, a certain actuation sequence of one or more input elements or the attachment of a mechanical and/or electronic key.

The operating console can be built into a transport means, for example a vehicle, such that a user can easily access the operating console while operating the transport means.

The operating console can be arranged, for example, in the interior of the transport means and/or on a dashboard.

The operating console can be supplied with electricity via an electricity source present in the transport means, for example a cigarette lighter or a USB interface.

Furthermore, apart from the previously mentioned components and characteristics, the operating console can include an on/off switch for the delivery of combustible to an outlet of the system, and/or LED elements for the status display (e.g. filling levels and/or error notice and/or warning notices) and/or one or more sockets, e.g. USB sockets, for charging electrical devices.

In particular, the combustible can be LPG, wherein as to whether an engine, which is to be supplied with fuel via the system, is supplied with LPG or another fuel, in particular petrol, can be set via the on/off switch.

In an embodiment, the system can be configured such that it includes a theft protection. For this, it includes a receiver, a portable transmitter and a control.

The control can be configured to carry out the functions that are necessary for the theft protection, additionally to the already mentioned functions of the control.

The receiver can be part of the aforementioned communication modules.

The theft protection is realised by way of the control switching the valves of the system such that the combustible, which is delivered out of the combustible container by the combustible delivery pump, and the fluid, which is delivered out of the fluid reservoir by a fluid delivery pump is transported back into the combustible container and into the fluid reservoir respectively, when the receiver is not in contact with the portable transmitter.

If, for example, the portable transmitter is not in communication with the receiver after a start of the fuel facility or of the engine, into which the system is installed, then the control can switch the switch-over valve that determines whether fluid (e.g., petrol), which is delivered by the drive unit (e.g., high-pressure pump), is led to the outlet of the system (and thus to the injection system) or to the inlet of the media transformer, such that the fluid is led to the media transformer. The control can simultaneously switch a feed-conduit-side control valve (if present) as well as the associated discharge-conduit-side control valve such that these valves are open. On account of this, the fluid flows back through the first volume in the direction of the fluid reservoir without a pumping effect acting upon the combustible. In other words: neither fluid nor combustible gets to an outlet of the system, which is connected to the injection system of the engine.

Alternative embodiments of the theft protection are conceivable. Thus, for example, a combustible return can be switched such that combustible, which is delivered by the media transformer, is delivered into the fuel container instead of the direction of the injection system of the engine.

The specific realisation of the theft projection depends on the embodiment of the system.

In a system with two media transformers that operate in opposite directions and that are realised as a hydraulic block as described beforehand, the theft projection for example can be as follows:

If the portable transmitter is not in communication with the receiver after a start of the fuel facility or the engine, into which the system is installed, the control ensures that the switch-over valve delivers the fluid (e.g. petrol) to the first block part. The first chamber feed conduit valve and the first chamber discharge conduit valve are simultaneously subjected to current in opposition. On account of this, the deflectable element moves up to the stop at one side and the fuel flows through the respective chamber of the first block and is delivered in the return to the fluid reservoir.

A delivery of the combustible can then be prevented by way of the non-activation of the first chamber feed conduit valve (or of the first chamber discharge conduit valve).

The signal, which is emitted by the portable transmitter, in particular, is of such a short range that the portable transmitter (while taking account possible shieldings) must be distanced within a radius of a few metres, for example within a radius of 3 metres, from the receiver, so that the system does not switch the valves such that neither combustible nor fluid is delivered to an outlet of the system, by which means the supply of an engine, which is supplied with fuel amid the use of the system, would be stopped.

Alternatively or supplementarily, a direct or indirect physical contact between the portable transmitter and the receiver can be necessary. This contact can be created by way of depositing or attaching the transmitter on a placement surface which is connected to the receiver via a lead/conductor.

The portable transmitter can be used supplementarily to a transmitter, as is particularly used in smart keys for the keyless access and starting systems.

The portable transmitter can be a mobile device, in particular the previously mentioned mobile device, which can communicate with the control and/or the operating console. In particular (but not only) in this case, a switching of the valves such that combustible or fluid is delivered to an outlet of the system can depend on the input of a code, for example in the previously mentioned app. It is also conceivable to make do without a direct input of the code in favour of a personalised app.

Alternatively, the mentioned code can also be inputted at the operating console.

A system according to any embodiment of the second aspect of the invention, which is additionally configured as a theft projection, can therefore solve the problem of vehicles whose unlocking and starting operation only entails a wireless communication between the transmitter and the vehicle-side receiver being simple to steal.

In particular, with the described system, this problem is solved by way of the presence of the communication between the portable transmitter and the system-side receiver being a precondition for fuel being fed to the engine of the vehicle. Irrespective of this, the communication between the portable transmitter and the system-side receiver fulfils no further function, so that the mentioned short range is sufficient. Smart keys according to the state of the art cannot have such a short range since they are also applied, for example, as part of an access system. Furthermore, smart keys according to the state of the art do not communicate with components of the fuel facility or of the engine.

The system according to the second aspect of the invention in one of the described embodiments can be the characterising element of a fuel facility, which includes the fluid reservoir for a fluid, a combustible container for a gaseous or liquid combustible, a drive unit and a conduit system.

In embodiments, in which the fuel facility serves for the operation of an engine, which can be operated with one or more fuels, and in which a first fuel additionally acts as a fluid, furthermore the first fuel container (fluid reservoir) can be connected to the inlet of the drive unit via the conduit system and an output of the drive unit can be connected to the injection system of the engine via the conduit system. In a fuel facility that includes the system according to the second aspect of the invention in one of the described embodiments, the drive unit can include a fuel high-pressure pump, which, in particular, is driven by the engine, which is supplied with fuel by the fuel facility.

In the mentioned embodiments with a first fuel which acts as a fluid, the fuel high-pressure pump in particular can be the fuel high-pressure pump of the first fuel, wherein the first fuel is that fuel, by way of which the engine was operated before the conversion to a bi-fuel engine.

The fuel facility can be applied in passenger vehicles, lorries, agricultural vehicles, ships or aircraft, but also stationary machines such as electricity generators, pumps and drives.

The fuel facility, or the system according to the second aspect of the invention in one of the described embodiments in particular can be the characterising part of a drive assembly, the drive assembly further including an engine.

The drive assembly for example is a stationary or mobile machine with a combustion motor, an electricity generator, or a drive for a device operating in a standalone manner.

Moreover, the drive assembly or rather the fuel facility, or the system according to the second aspect of the invention in one of the described embodiments can characterise a transport means. Examples of such transport means are vehicles (passenger vehicles, lorries, agricultural vehicles, vehicles for construction etc.), ships or aircraft.

In particular, the transport means is a motorised vehicle, for example one of the previously mentioned ones. As has been described beforehand and hereinafter, this can be driven by a bi-fuel combustion machine (engine).

Finally, a fuel facility, a drive assembly, a transport means or a motorised vehicle can also be characterised by the fact that it includes a system for the exchange of different fuels that can be used for the operation of an engine, according to the first aspect of the invention, as well as a system for delivering a liquid or gaseous combustible, according to the second aspect of the invention.

BRIEF DESCRIPTION OF THE DRAWINGS

Embodiment examples of the invention are hereinafter described by way of figures. In the figures, the same reference numerals indicate the same or analogous elements. With reference to the Figures.

DETAILED DESCRIPTION OF THE INVENTION

Figure 1:
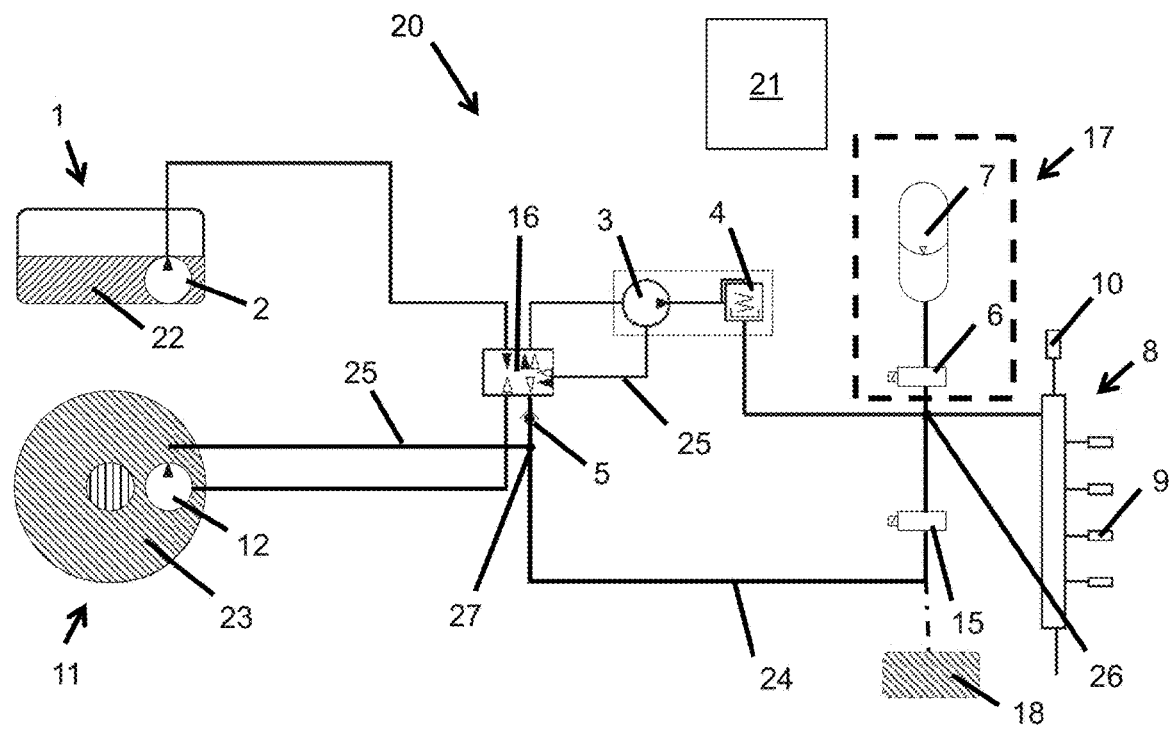
FIG. 1 shows a schematic representation of a fuel facility with an installed system according to a first aspect of the invention, wherein the fuel facility supplies a four-cylinder combustion motor with a direct injection of fuel.

FIG. 1 shows a schematic representation of a fuel facility 20 with an installed system according to a first aspect of the invention. The engine, which is supplied with fuel via the fuel facility 20, is a four-cylinder combustion motor with a direct injection, which is operated with a first fuel 22 (e.g. petrol) and a second fuel 23 (e.g. LPG). For this, the fuel facility includes the following elements before the installation of the system for the exchange of the fuels:

A first fuel container 1 for the first fuel 22, a first fuel delivery pump 2, which transports the first fuel 22 from the first fuel container 1 into a conduit system of the fuel facility;

a second fuel container 11 for the second fuel 23, a second fuel delivery pump 12, which transports the second fuel 23 from the second fuel container 11 into the conduit system of the engine;

a fuel high-pressure pump 3 with a pressure regulator 4;

a fuel distributor 16, which is configured to switch between a feed of the first and the second fuel, to the fuel high-pressure pump 3. The fuel distributor 16 can further be configured to ensure a return of the second fuel 23 from the fuel high-pressure pump 3 to the second fuel container 11 via a fuel facility return conduit 25.

The engine further includes an injection system 8 with injection nozzles 9 and a pressure sensor 10 for the monitoring and control of the pressure in the injection system.

In the shown embodiment, the system for the exchange of fuels includes a fuel exchange unit 17 with a pressure accumulator 7 and with a pressure accumulator valve 6, an exchange return conduit 24, a return valve 15 and a check valve 5, wherein the latter as a rule is integrated in the fuel distributor 16.

The pressure accumulator 7 and the pressure accumulator valve 6 are arranged upstream of the injection system 8 of the engine and downstream of the fuel high-pressure pump 3 or rather the pressure regulator 4 respectively, by way of them being connected to a corresponding part of the conduit system of the fuel facility.

The exchange return conduit 24 connects the mentioned part of the conduit system of the fuel facility between the fuel high-pressure pump 3 or rather the pressure regulator 4, and the injection system 8, to the fuel facility return conduit 25. For this, the exchange return conduit 24 includes a high-pressure-side connection 26 onto the mentioned part of the conduit system of the fuel facility and a second connection 27 onto the fuel facility return conduit 25. The return valve 15 controls the flow of a fuel via the exchange return conduit 24 by way of it being integrated into the exchange return conduit 24.

The check valve 5 prevents fuel, which is led via the exchange return conduit 24, from penetrating into the fuel distributor 16.

A fuel facility which is as shown in FIG. 1, with an installed system according to the first aspect of the invention can be operated as follows:

Operation of the engine by the first fuel 22: the first fuel delivery pump 2 delivers first fuel 22 out of the first fuel container 1 into the conduit system of the fuel facility 20. The fuel distributor 16 leads this fuel to the fuel high-pressure pump 3 and to the pressure regulator 4, where the first fuel 22 is brought to the operating pressure (system pressure) which is required for the first fuel. The first fuel 22 which is at the operating pressure is then fed to the injection system 8 via the conduit system of the fuel facility.

On operation of the engine with the first fuel 22, the second fuel delivery pump 12 is inactive and the return valve 15 is closed.

The pressure accumulator 7 is filled with the first fuel 22 during the operation of the engine. This corresponds to a first step for the exchange of the fuel while using the system according to the first aspect of the invention. The pressure accumulator valve 6 is opened for this. The pressure accumulator valve 6 is closed after filling the pressure accumulator 7.

Operation of the engine by the second fuel 23: the second fuel delivery pump 12 delivers second fuel 23 out of the second fuel container 11 into the conduit system of the fuel facility 20. The fuel distributor 16 leads this fuel to the fuel high-pressure pump 3 and to the pressure regulator 4 where the second fuel 23 is brought to the operating pressure (system pressure) that is necessary for the second fuel. The second fuel 23, which is at the operating pressure, is then fed to the injection system 8 via the conduit system of the fuel facility.

The fuel facility return conduit 25, which is led via the fuel distributor 16, ensures that excess second fuel is led back into the second fuel container. Furthermore, the fuel facility return conduit 25 ensures a return of second fuel given cavitation in the inlet region of fuel high-pressure pump 3.

The return valve 15 as well as the pressure accumulator valve 6 is closed on operation of the engine with the second fuel 23.

Discharge of the second fuel 23 via the exchange return conduit 24: this corresponds to the second step for the exchange of the fuel amid the use of the system according to the first aspect of the invention. Herein, after switching off the engine, the second fuel 23, which is located in the injection system 8 and in parts of the conduit system of the fuel facility, is discharged into the second fuel container 11 by way of the return valve 15 opening. The first and the second fuel delivery pump as well as the fuel high-pressure pump 3 and the injection system 8 are inactive and the pressure accumulator valve 6 is closed.

Alternatively, a discharge of the second fuel 23 into a storage container 18 for the second fuel 23 is possible. The second fuel 23, which is stored in the storage container 18, can be delivered again in the direction of the injection system on later operation of the engine with the second fuel 23. This alterative embodiment is characterised in FIG. 1 by dot-dashed lines.

Filling of the injection system 8 with first fuel 22 from the pressure accumulator 7: this corresponds to the third step for the exchange of the fuel amid the use of the system according to the first aspect of the invention. For this, the return valve 15 is closed before the pressure accumulator valve 6 is opened. The first and second fuel pump as well as the fuel high-pressure pump 3 and the injection system 8 are inactive.

Figure 2:
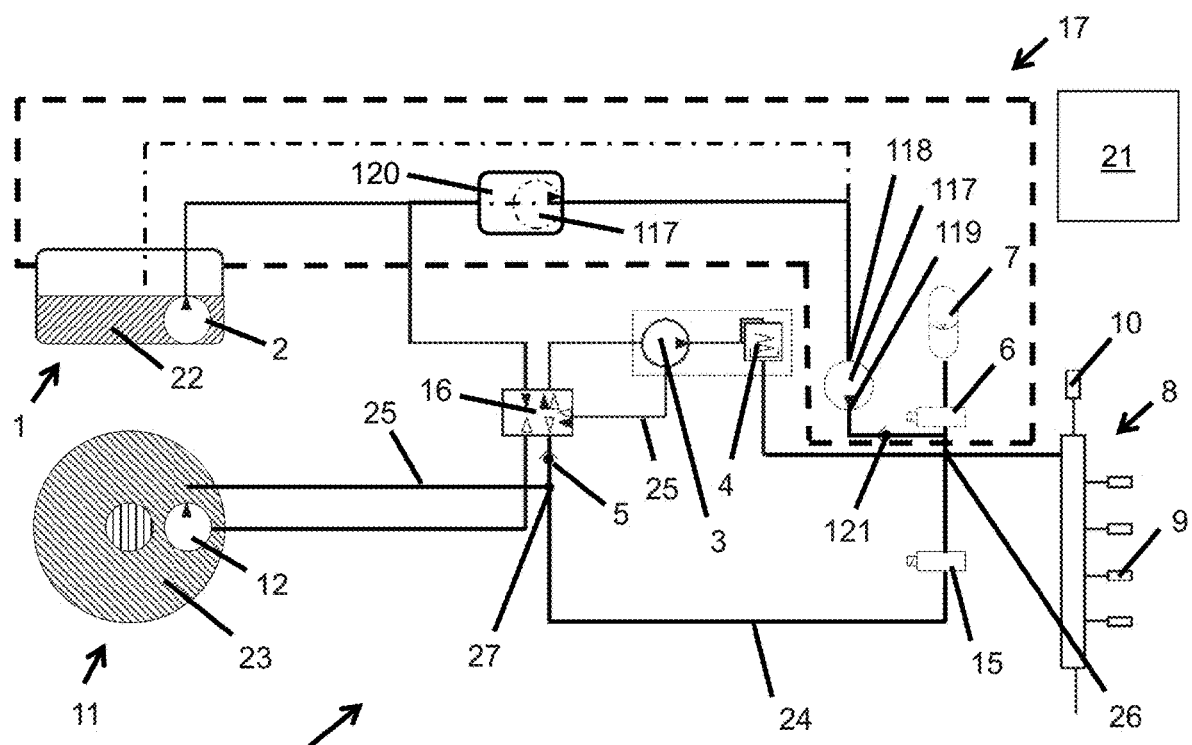
FIG. 2 shows a schematic representation of the fuel facility according to FIG. 1 with an alternative system according to the first aspect of the invention.

FIG. 2 shows a schematic representation of a fuel facility 20 according to FIG. 1, in which facility an alternative system according to the first aspect of the invention is installed by way of the system as a central element including a boost pump 117 with a boost pump inlet 118 and a boost pump outlet 119, instead of the pressure accumulator 7.

The boost pump is connected to the high-pressure region of the fuel facility 20 via the high-pressure-side connection 26 and is secured against overpressure at the boost pump outlet 119 by a boost pump check valve 121.

In the shown embodiment, the boost pump obtains the first fuel 22 from a reservoir 120, which is designed as a separate container and which is filled during the operation of the engine, and thus of the first fuel delivery pump 2. However, the boost pump can also be integrated into the reservoir 120.

Alterative embodiments for the supply of the boost pump 117 without a reservoir 120 are represented by way of dot-dashed lines. Herein, it is the case of a direct supply out of the first fuel container 1 or a supply via an access to a region of the conduit system, in which region the first fuel 22 can be fed. The latter can necessitate a switching-on of the first fuel delivery pump 2.

The boost pump 117 can moreover be cascadable, which is to say that several pumps are connectable one after the other for the purpose of increasing the pressure.

FIG. 2 as a possible supplement further shows a pressure accumulator 7 and a pressure accumulator valve 6, which can be applied for increasing the pressure of the first fuel 22, which flows out of the boost pump outlet 119 in the direction of the injection system 8.

Figure 3:
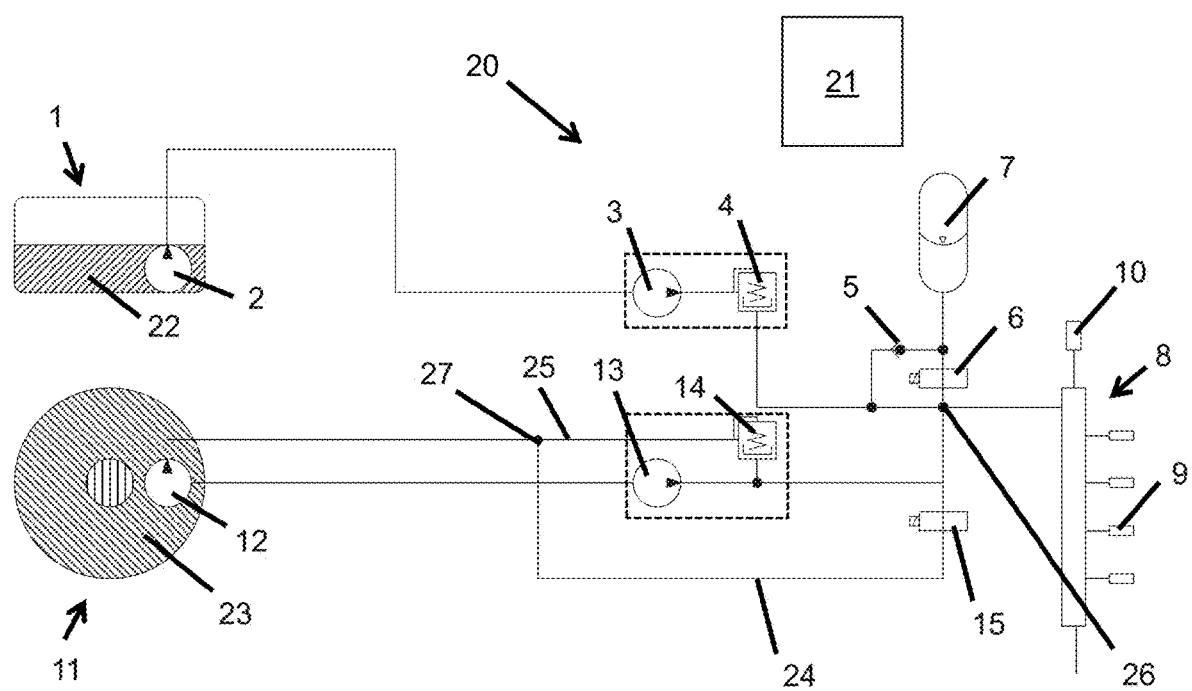
FIG. 3 shows a schematic representation of a second fuel facility with an installed system according to the first aspect of the invention, wherein the fuel facility is again a four-cylinder combustion motor with a direct injection of fuel.

FIG. 3 shows a schematic representation of a second embodiment of a fuel facility 20 with an installed system according to the first aspect of the invention. As in FIG. 1, the engine is a four-cylinder combustion motor with a direct injection, which is operated via the fuel facility 20 with a first fuel 22 (e.g. petrol) and a second fuel 23 (e.g. LPG). The main difference to the fuel facility according to FIG. 1 lies in the first and the second fuel being brought to the operating pressure in each case via a separate fuel high-pressure pump each in combination with a pressure regulator. The shown fuel facility with the installed system according to the first aspect of the invention therefore has the following differences to the fuel facility according to FIG. 1:

A second fuel high-pressure pump 13 with a second pressure regulator 14 is present apart from a first fuel high-pressure pump 3 with the first pressure regulator 4.

The fuel facility return conduit 25 connects an outlet of the second pressure regulator 14 to the second fuel container 11 in a direct manner.

The operation of the fuel facility 20, which is shown in FIG. 3, with the installed system according to the first aspect of the invention as well as the exchange of the fuels is analogous to that of the engine with the installed system according to the first aspect of the invention, which is shown in FIG. 1.

FIG. 3 further shows an alternative embodiment for filling the pressure accumulator 7. For this, the system includes a bypass to the pressure accumulator valve 6, wherein a check valve 5 ensures that the first fuel 22 via this bypass only flows into the pressure accumulator 7 but not out of this. The pressure accumulator valve 6 is then always in the closed state, except for when the first fuel 22, which is located in the pressure accumulator 7 is to be discharged into the injection system.

Figure 4:
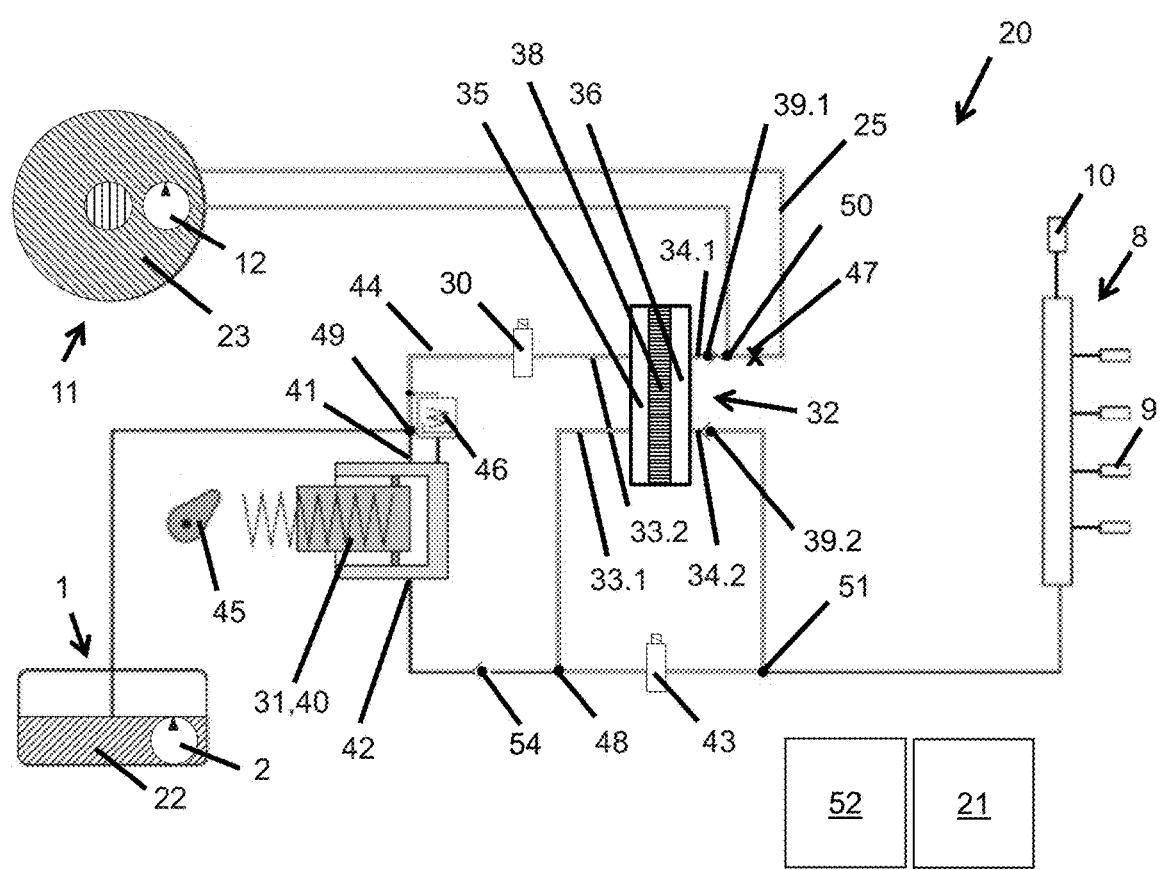
FIG. 4 shows a schematic representation of a fuel facility with an installed system according to a second aspect of the invention, wherein the fuel facility supplies a four-cylinder combustion motor with a direct injection of fuel.

FIG. 4 shows a schematic representation of a fuel facility 20 with an installed system according to the second aspect of the invention. The fuel facility 20 with the installed system on the one hand, via a fuel high-pressure pump 40, which in the shown embodiment, also carries out the function of a drive unit 31, transports a first fuel 22 (e.g. petrol) from a first fuel container 1 to an injection system 8. On the other hand, the fuel facility 20 via a media transformer 32 transports a second fuel 23 (e.g. LPG) from a second fuel container 11 to the injection system 8. As in FIGS. 1 to 3, the engine, which is supplied via the fuel facility 20, is a four-cylinder combustion engine with a direct injection.

The fuel facility includes the following elements before the installation of the system: the first fuel container 1 with a first fuel delivery pump 2, which transports the first fuel 22 from the first fuel container 1 into the conduit system of the fuel facility: the fuel high-pressure pump 40 with a pressure regulator 46 for the first fuel 22; the injection system 8 with injection nozzles 9 and with a pressure sensor 10 for the monitoring and control of the pressure in the injection system 8; an engine-side control 52, which also controls the operation of the fuel facility before the installation of the system.

In the shown embodiment, the system includes:

The media transformer 32, which can be supplied with the first fuel 22 via a first feed conduit/discharge conduit pair (first feed conduit 33.1, first discharge conduit 33.2) and which is configured, amid the use of a second feed conduit/discharge conduit pair (second feed conduit 34.1, second discharge conduit 34.2), to bring the second fuel 23 to the operating pressure and to transport it to the injection system 8 via the conduit system.

A first feed conduit connection 48, a first discharge conduit connection 49, a second feed conduit connection 50 and a second discharge conduit connection 51. Herein, the first feed conduit connection 48 and the second discharge conduit connection 51 access a part of the conduit system of the fuel facility, the part being located between the fuel high-pressure pump 40 and the injection system 8, wherein the second discharge conduit connection 51 is arranged downstream of the first feed conduit connection 48. The first discharge conduit connection 49 accesses a part of the of the conduit system of the fuel facility, the part being located between the first fuel container 1 and the fuel high-pressure pump 40. The second feed conduit connection 50 ensures a connection of the media transformer 32 to the second fuel container 11, wherein this connection is arranged downstream of a possibly present fuel facility return conduit 25 or is realised via a T-piece.

A switch-over valve 43, with which one can switch between a supply of the injection system 8 with the first fuel 22 and a supply with the second fuel 23. In the shown embodiment, the switch-over valve 43 is arranged in the conduit system between the first feed conduit connection 48 and the second discharge conduit connection 51. In particular a feed conduit connection 48, which is designed as a 3/2 way valve, is alternatively advantageous.

A controllable valve 30, with which the discharge of the first fuel 22 out of the media transformer 32 via a return 44 to the inlet of the fuel high-pressure pump 40, or rather to the first fuel container 1 is controllable. The controllable valve 30 is further configured to control the flow of first fuel 22 through the media transformer 32. The controllable valve 30 switches quickly, i.e. at the rate (cycle) of the pressure regulator 46 of the fuel high-pressure pump 40.

A feed-conduit-side check valve 39.1, by way of which it is ensured that no fuel can leave the media transformer 32 via the second feed conduit 34.1.

A discharge-conduit-side check valve 39.2, by way of which it is ensured that no fuel flows into the media transformer 32 via the second discharge conduit 34.2.

An aperture 47 or a pressure regulator, via which excess second fuel in the region of the second feed conduit 34.1 can be led back in the direction of the second fuel container 11. Further, a return of the second fuel can be ensured via the aperture 47 or via the pressure regulator, in the case of cavitation (formation of gas).

A control 21 is configured to control the system. In particular, the control 21 regulates all valves of the system that are necessary for the operation of the fuel facility with the integrated system, the operation being described hereinafter.

A high-pressure-side check valve 54, which ensures that no fuel flows out of the media transformer 32 in the direction of the fuel high-pressure pump 40 via the first feed conduit 33.1 If, as is shown in FIG. 4, the fuel high-pressure pump 40 executes the function of the drive unit 31, then the high-pressure-side check valve 54 is integrated into the fuel high-pressure pump 40.

The system can additionally include the following elements, depending on whether the system is used for retrofitting to a bi-fuel fuel facility or whether the system is installed into a fuel facility, which is already retrofitted for bi-fuel: the second fuel container 11 with a second fuel delivery pump 12; a conduit system, which connects an outlet of the second fuel delivery pump 12 to the second feed conduit 34.1 of the media transformer 32; the fuel facility return conduit 25.

In the shown embodiment, the media transformer 32 includes a first volume 35 and a second volume 36, which are separated in a liquid-tight manner by a piston 38.

Figure 9:
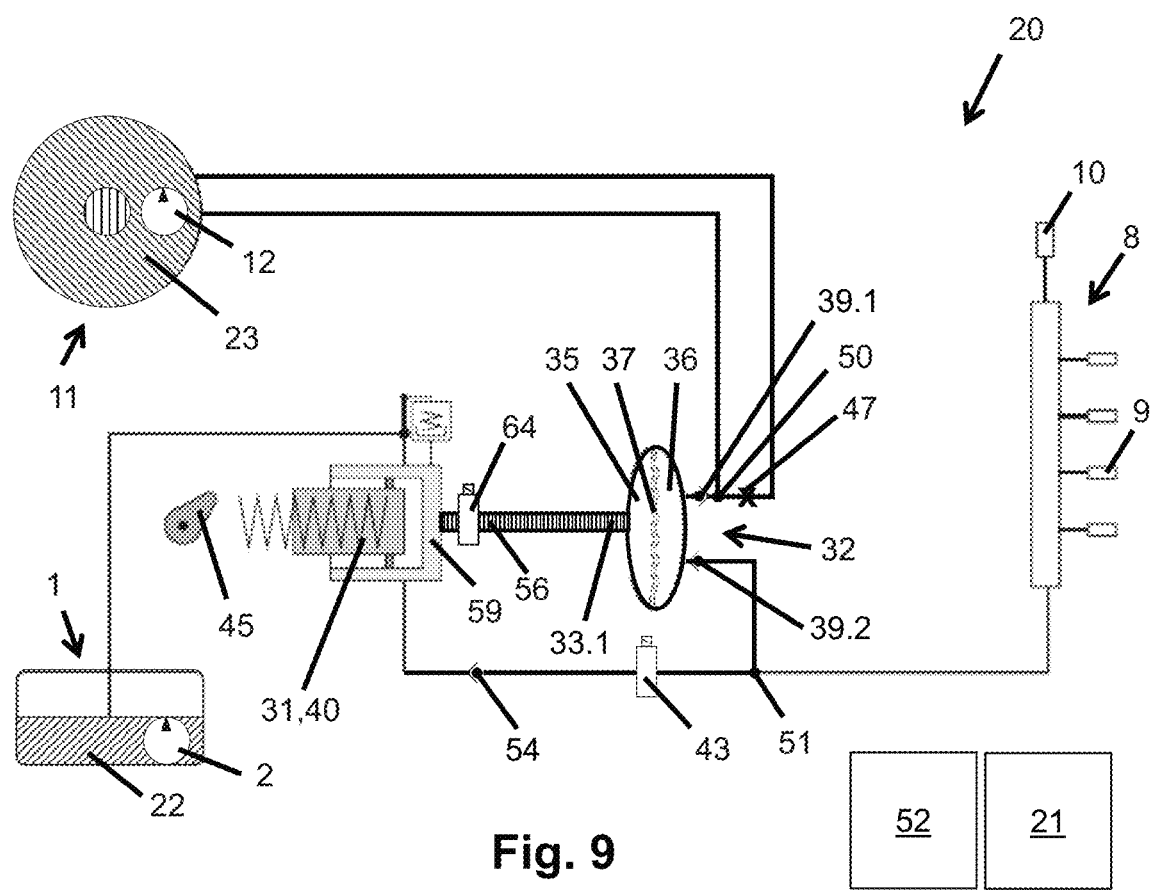
FIG. 9 shows a schematic representation of a further alternative embodiment of a fuel facility with an installed system according to the second aspect of the invention.

Instead of the piston 38, the first volume 35 can also be separated from the second volume 36 in a liquid-tight manner by a membrane 37 (as is shown for example in FIG. 9).

The first fuel 22 can be led into and out of the first volume 35 via the first feed conduit/discharge conduit pair. The second fuel 23 can be led into and out of the second volume 36 via the second feed conduit/discharge conduit pair.

An engine as is shown in FIG. 4, with an installed system according to the second aspect of the invention functions as follows:

The first fuel delivery pump 2 transports the first fuel 1 at a preliminary pressure to an inlet 41 of the fuel high-pressure pump 40;

The fuel high-pressure pump 40 brings the first fuel 22 to the operating pressure, which as a rule is greater than 40 bar. The fuel high-pressure pump is driven by the engine itself via a camshaft. By way of this, the pressure of the first fuel 22 varies in a cycle, which is predefined by the motor and which, in particular, is dependent on the motor speed and the number of cams on the camshaft.

The switch-over valve 43 is opened (or rather the 3/2 way valve leads the first fuel 22 in the direction of the injection system 8) and the controllable valve 30 is closed, on operation of the engine with the first fuel 22. The system of the second fuel is inactive due to this and the engine is driven by the first fuel 11, as was the case with the fuel facility before the installation of the system.

On operation of the engine with the second fuel 23, the switch-over valve 43 is closed, or rather the 3/2 way valve leads the first fuel 22 in the direction of the first feed conduit 33.1 of the media transformer 32. The first fuel 22 can be diverted into the first volume 35 under a cyclically varying high pressure by way of this.

Furthermore, the second fuel delivery pump 12 transports the second fuel 23 via the second feed conduit 34.1 into the second volume 36 where a cyclical pressure increase take space. Herein, a cycle includes the following steps:

1. Initial situation: the first volume 35 is filled with the first fuel 22 and the second volume 36 is filled with the second fuel 23, wherein the pressure in the two volumes is identical and the piston 38 assumes a basic position. The controllable valve 30 is closed.
2. The first fuel 22 enters at high pressure into the first volume 35 via the first feed conduit 33.1. The piston 38 is deflected in the direction of the second volume 36 by way of this and the second fuel 23 is subjected to pressure.
3. The second fuel 23 exits at pressure out of the second volume 36 in the direction of the injection system 8 via the second discharge conduit 34.2. The feed-conduit-side check valve 39.1 prevents an outflow of the second fuel 23 via the second feed conduit 34.1
4. The fuel high-pressure pump 40 no longer delivers first fuel 22 in the direction of the media transformer 32 and the controllable valve 30 briefly opens, by which means first fuel 22 exits out of the first volume 35. Second fuel 23 can enter into the second volume 36 via the second feed conduit 34.1 on account of this and the piston can return into its basic position.
5. The controllable valve 30 closes and the cycle can begin afresh. The system is activated in the cycle of the engine, given a combustion motor in the cycle of the motor speed, in order to permit a smooth running of the engine.

Figure 5:
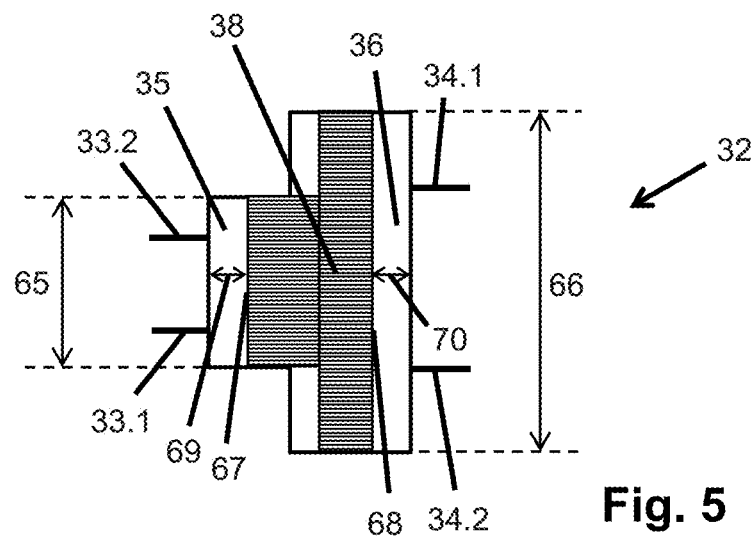
FIG. 5 shows a schematic representation of a media transformer which additionally operates as a pressure and delivery rate transformer.

FIG. 5 shows a schematic representation of a media transformer 32, which has dimensions, by way of which the media transformer 32 can be operated as a pressure and delivery rate transformer. For this, the piston 38 (or the membrane 37) towards the first volume 35 includes a first end-face 67 and towards the second volume 36 includes a second end-face 68. Apart from a first spatial extension 69, which is perpendicular to the first end-face 67 and is variable by way of the movement of the piston 38 (or by the deflection of the membrane 37), the first volume 35 is given by a first circular profile with a first diameter 65. Analogously, apart from a second spatial extension 70, which is perpendicular to the second end-face 68 and which is variable by way of the movement of the piston 38 (or by the deflection of the membrane 37), the second volume 36 is given by a second, circular profile with a second diameter 66.

In the shown embodiment, the surface area of the first end-face 67 is smaller than the surface area of the second end-face 68. On account of this, the media transformer 32 acts as a pressure reducer after the connection via the first feed conduit/discharge conduit (33.1, 33.2), or the second feed conduit/discharge conduit (34.1, 34.2), i.e. the pressure ("second pressure"), which is produced in the second volume, is lower than the pressure ("first pressure"), which prevails in the first volume. Furthermore, the quantity of second fuel, which is delivered by the shown media transformer 32, is greater than the quantity of first fuel, which is delivered by the first volume, i.e. the delivery rate is increased.

Figure 6:
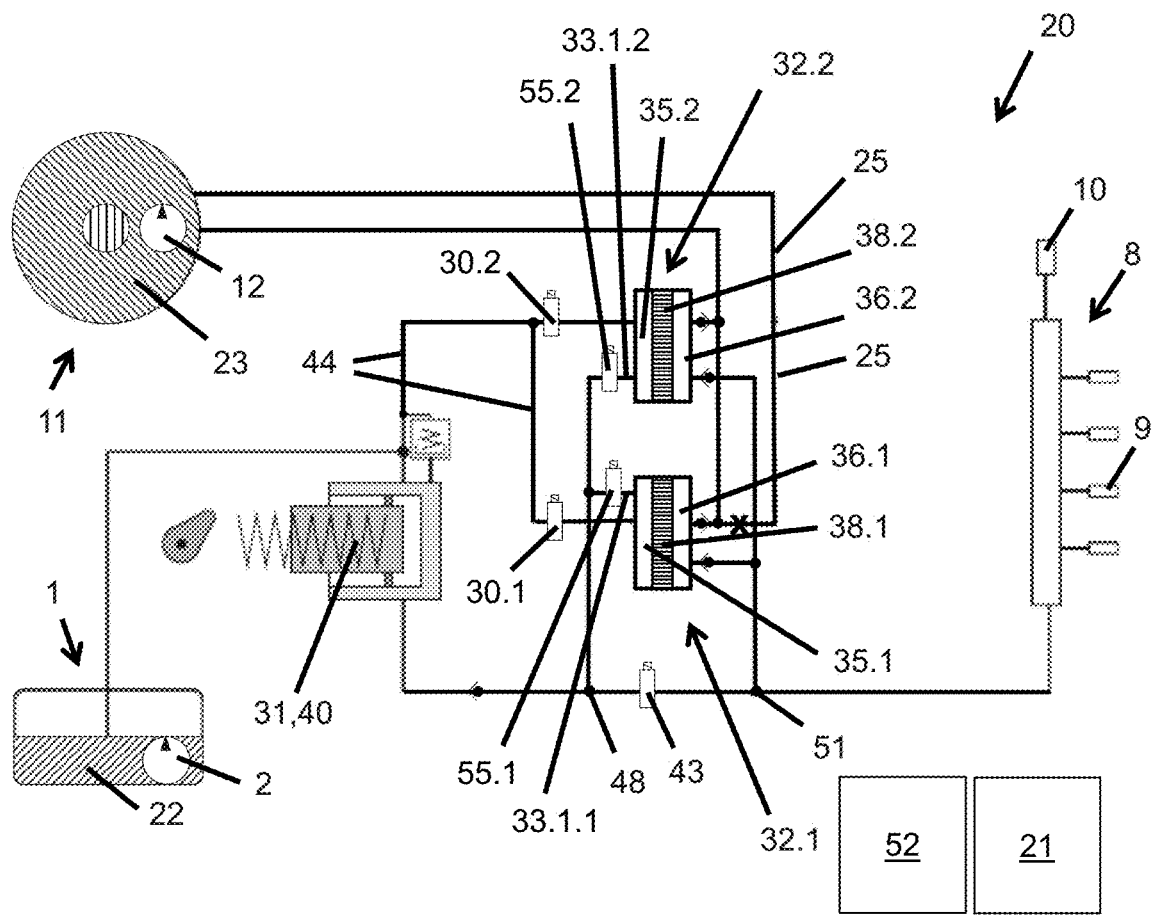
FIG. 6 shows a schematic representation of an alternative embodiment of a fuel facility with an installed system according to the second aspect of the invention, the system including two media transformers.

FIG. 6 shows a fuel facility 20, into which a system according to the second aspect of the invention is installed, wherein the system in the shown embodiment include a first media transformer 32.1 and a second media transformer 32.2. The two media transformers are connected in parallel and interact such that the engine is sufficiently supplied with the second fuel 23, although both media transformers operate in a switching range, which is lower or the same as the cycling of the fuel high-pressure pump 40. The two media transformers operate asynchronously for this, i.e. the deflection of the piston 38.1 of the second media transformer 32.2 and therefore the delivery of the second fuel 23 by the second media transformer 32.2 begins as soon as the piston 38.1 (or the membrane) of the first media transformer 32.1 is deflected maximally in the direction of the second volume 36.1 of the first media transformer 32.1. While the second media transformer 32.2 delivers the second fuel 23, the piston 38.1 of the first media transformer 32.1 returns into its non-deflected basic position and the second fuel 23 flows into the enlarging second volume 36.1 of the first media transformer 32.1. The piston 38.1 of the first media transformer 32.1 then at the latest assumes its non-deflected basic position when the piston 38.2 of the second media transformer 32.2 is deflected maximally in the direction of the second volume 36.2 of the second media transformer 32.2, by which means the first media transformer 32.1 can assume the delivery of the second fuel 23 while the piston 38.2 of the second media transformer 32.2 can return into its non-deflected basic position amid the inflow of the second fuel 23 into the second volume 36.2 of the second media transformer 32.2.

In order to ensure an asynchronous interaction of the two media transformers, the system according to FIG. 6 additionally includes a first feed-conduit-side control valve 55.1, which is attached to the first feed conduit 33.1.1 of the first media transformer 32.1, and a second feed-conduit-side control valve 55.2, which is attached to the first feed conduit 33.1.2 of the second media transformer 32.2. Disregarding this, the two media transformers are integrated into the fuel facility 20 analogously to FIG. 4 and they are operated as previously described (amongst others switch-over valve 43, controllable valve 30.1 of the first media transformer 32.1, first feed conduit connection 48, second discharge conduit connection 51, controllable valve 30.2 of the second media transformer 32.2, fuel facility return conduit 25, return 44 etc.).

Figure 7:
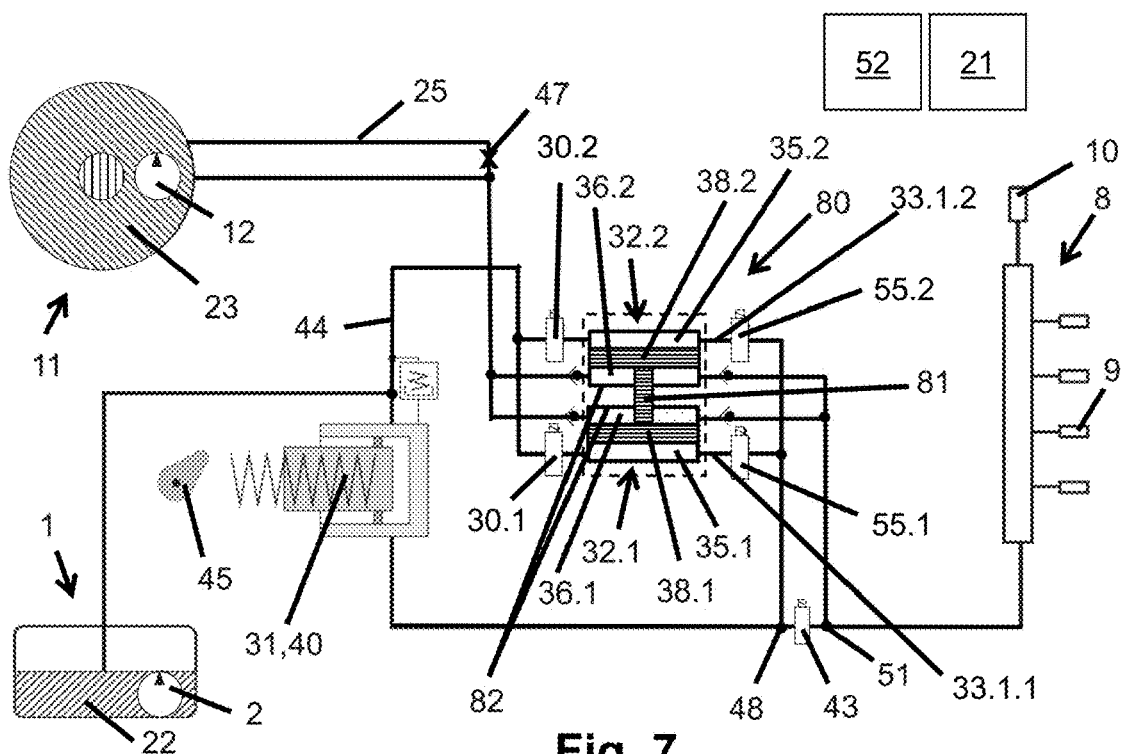
FIG. 7 shows a schematic representation of a fuel facility with an installed double media transformer with two fronts.

Alternatively, an asynchronous interaction of the two media transformers can also be achieved by an integral construction manner of the media transformers. FIG. 7 shows an embodiment to that effect, by way of example of a double media transformer 80 with two fronts. In the shown embodiment, the piston 38.1 of the first media transformer 32.1 (or of its deflectable element) forms a first front and the piston 38.2 of the second media transformer 32.2 (or its deflectable element) a second front. The piston 38.1 of the first media transformer 32.1 is herein connected to the piston 38.2 of the second media transformer 32.2 via a rigid connection 81. The second volume 36.1 of the first media transformer 32.1 is separated from the second volume 36.2 of the second media transformer 32.2 by a separating wall 82, wherein the rigid connection 81 of the two pistons is moveably mounted in the separating wall 82 by way of a guide such that no pressure equalisation takes place between the two second volumes or between a second volume and the surroundings. The feed conduit and discharge conduit into/out of the first volume of one of each media transformer ("first feed conduit/discharge conduit") are each located in a region of the media transformer, which lies at the side of the respective piston, which is away from the separating wall 82. This region consequently defines the respective first volume (first volume 35.1 of the first media transformer 32.1, first volume 35.2 of the second media transformer 32.2). The feed conduit and discharge conduit into/out of the second volume of one of each media transformer ("second feed conduit/discharge conduit") are each located in a region of the media transformer, which lies between the separating wall 82 and the respective piston. Such a media transformer is operated by way of fluid (first fuel) being alternately admitted at pressure into the first volume 35.1 of the first media transformer 32.1 and into the first volume 35.2 of the second media transformer 32.2.

Supplementarily or alternatively to embodiments with two (or more) media transformers, it is also possible to dimension the two media transformers differently, in particular to select a different ratio between the first and the second diameter (see also FIGS. 5 and 8), and possibly to ensure different activation times of the valves, which control the first or the second media transformers, via the control 21, so that the second fuel 23, which flows out of the first media transformer 32.1 in the direction of the injection system 8, has a different pressure and/or different delivery rate per cycle in comparison with the second fuel 23, which flows out of the second media transformer 32.2.

Alternatively, the first and the second volume, or the first and second feed conduit/discharge conduit pair of each media transformer can be swapped.

Embodiments of the media transformer, concerning which the first volume 35 is separated from the second volume 36 by a piston 38 in each case, are shown in FIG. 7. Alternatively, one or both media transformers can operate with a membrane 37 as shown in FIG. 9.

Figure 8:
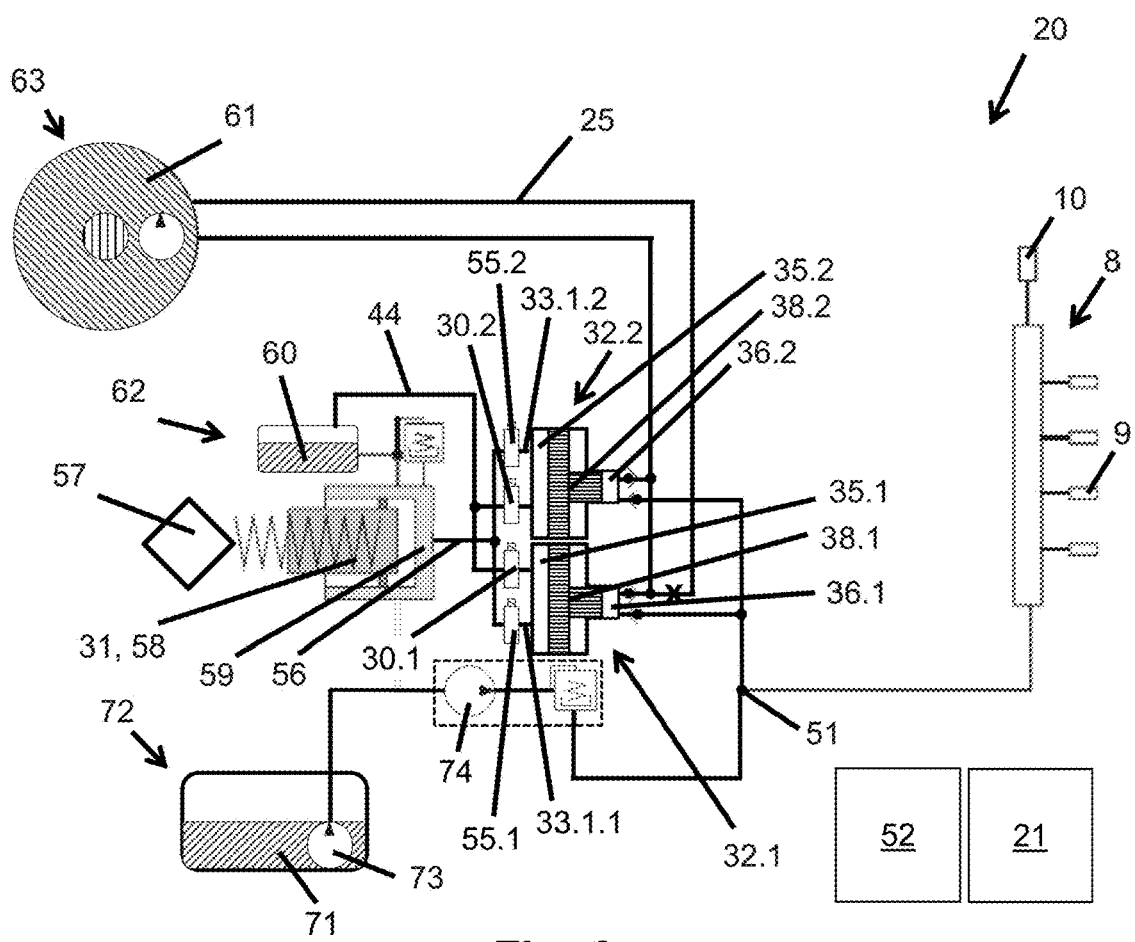
FIG. 8 shows a schematic representation of a further alternative embodiment of a fuel facility with an installed system according to the second aspect of the invention.

FIG. 8 shows a fuel facility 20, into which a system according to the second aspect of the invention is integrated, wherein it is not a fuel high-pressure pump that serves as a drive unit 31, but another pump 58 which delivers a fluid 60. An example of such a pump is an oil pump, which is driven via a chain drive 57.

Since such pumps 58 as a rule generate no cyclical pressure peaks, the system, which is shown in FIG. 8, includes a first media converter 32.1 and a second media converter 32.2, a first feed-conduit-side control valve 55.1 and a controllable (discharge-conduit-side) valve 30.1 of the first media transformer 32.1 as well as a second feed-conduit-side control valve 55.2 and a controllable (discharge-conduit-side) valve 30.2 of the second media transformer 32.2. The system further includes a fluid reservoir 62 and a return conduit 44, which connects the first volume of the first and second media transformer to the fluid reservoir via the respective (discharge-conduit-side) controllable valve.

Furthermore, in the shown embodiment, the media transformers at the side of their first volume (first volume 35.1 of the first media transformer 32.1, first volume 35.2 of the second media transformer 32.2) are flanged on the drive unit 31, which is designed as a pump 58, and can be supplied with the fluid 60, which is under pressure from the compression space 59 of the pump 58, in a direct manner by way of a pressure conduit 56. A supply via another outlet of the drive unit and/or via a conduit system, which belongs to the drive unit, is likewise possible.

A cyclically varying pressure can be produced at the feed conduit 33.1.1 to the first volume 35.1 of the first media transformer 32.1 and at the feed conduit 33.1.2 to the first volume 35.2 of the second media transformer 32.2 respectively, with the help of the feed-conduit-side control valves (55.1 and 55.2), the (discharge-conduit-side) controllable valves (30.1 and 30.2) as well as a suitably designed control 21. Herein, the two media transformers again operate asynchronously to one another, as is described for example in combination with FIG. 6.

If necessary, a loss of fluid 60 or another use of the fluid 60 can be compensated by the fluid reservoir 62.

The media transformers according to FIG. 8 are further dimensioned such that they additionally operate as pressure transformers with a view to a pressure increase of the combustible 61, which is delivered via the second volume 36.1 of the first media transformer 32.1, or via the second volume 36.2 of the second media transformer 32.2, compared to the pressure of the fluid 60.

The combustible 61, which is delivered by the system according to FIG. 8, as is shown in FIG. 4 gets from a combustible container 63 into the second volume 36.1 of the first media transformer 32.1 or into the second volume 36.2 of the second media transformer 32.2 and from there to the injection system 8 of the engine.

Optionally, the fuel facility 20, which is shown in FIG. 8, can include a part-region for the delivery of a second combustible 71. In particular, this part-region includes a second combustible container 72 with a combustible delivery pump 73 and a combustible high-pressure pump 74 with a pressure regulator.

FIG. 9 shows a fuel facility 20, into which a system according to the second aspect of the invention is integrated and which serves for the supply of a bi-fuel combustion motor with a direct fuel injection. In the shown embodiment, the media transformer 32 has a membrane 37, which separates the first from the second volume. Furthermore, the first volume 35 (analogously to FIG. 8) is supplied directly from the compression space 59 of the fuel high-pressure pump 40 of the first fluid 22 via the pressure conduit 56. The first fuel 22 consequently assumes the function of the fluid 60 and the fuel high-pressure pump 40, which is driven by the combustion motor via the camshaft 45, again functions as the drive unit 31. Herein, first fuel 22, which is located in the compression space 59 of the fuel high-pressure pump 40, is transported in the direction of the first volume 35 of the media transformer 32 at a cycle that is defined by the motor (depending on the number of cams on the camshaft 45). A closure valve 64 decouples the media transformer from the compression space 59 as soon as the engine is operated via the first fluid 22.

A return 44 from the first volume 35 of the media transformer 32 to the inlet of the drive unit 31, the return being controlled by the controllable valve 30, can be done away with on account of this design with a pressure conduit 56, in which the fluid acts as a hydraulic liquid.

Figure 10:
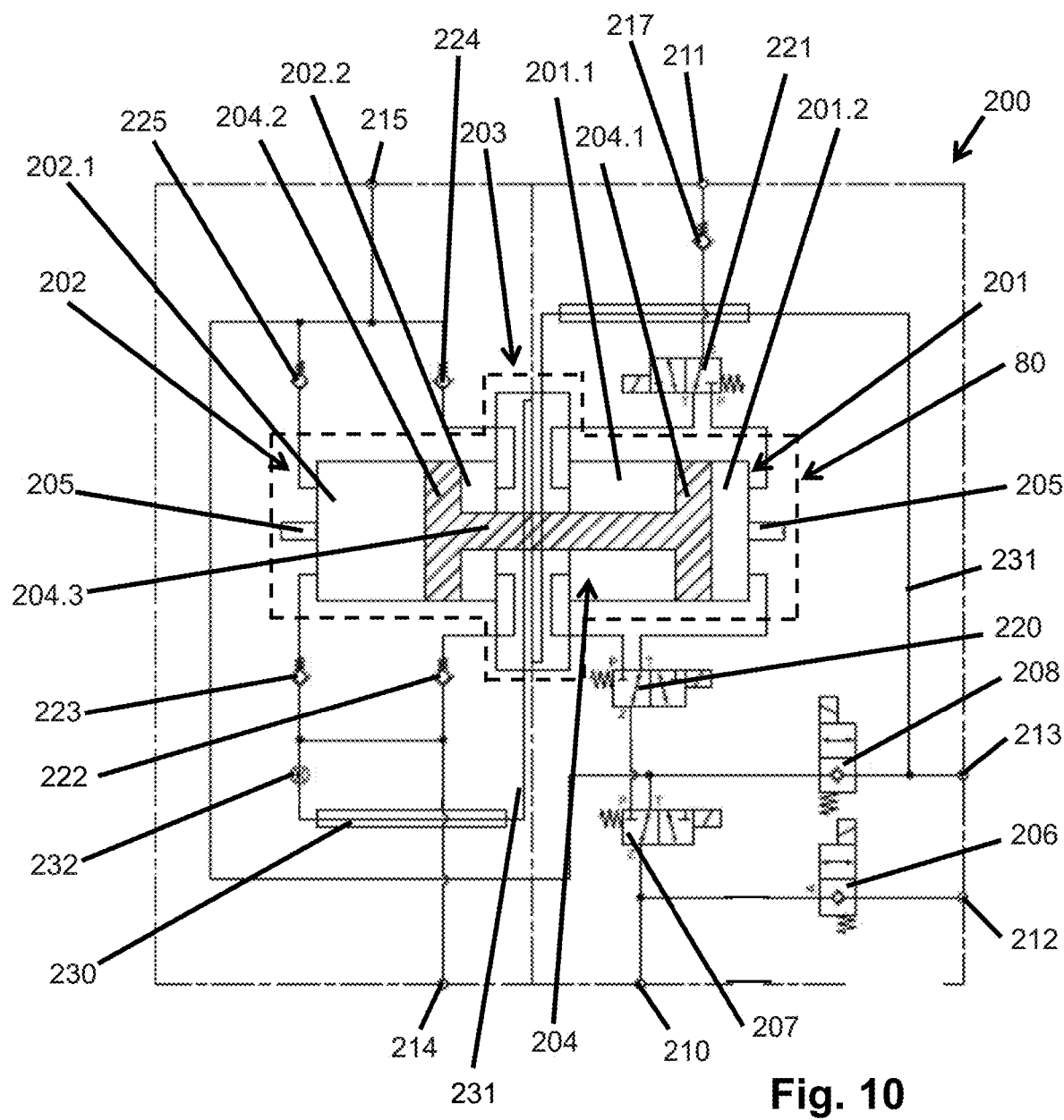
FIG. 10 shows a schematic representation of a system according to the second aspect of the invention, the system including a double media transformer which is realised as a hydraulic block.

The elements of the system that are necessary for the feed of the second fuel 23 to the media transformer 32 and to the injection system 8 as well as the switching between the first and the second fuel are analogous to FIG. 4 in this embodiment FIG. 10 shows an embodiment of the system 200 according to the second aspect of the invention that includes a double media transformer 80, which is realised as a hydraulic block.

The hydraulic block includes a first block part 201, a second block part 202, a third block part 203 and the deflectable element 204.

The deflectable element 204 includes a first piston 204.1, a second piston 204.2 and a rigid piston connection (piston rod) 204.3. The piston connection 204.3 is led perpendicularly to the end-face of the first and second piston and is led through a guide in the third block part 203.

The first piston 204.1 is configured such that it is guided by a piston bore in the first block part 201. The second piston 204.2 is configured such that it is guided by a piston bore in the second block part 202.

The guides of the piston connection 204.3, of the first piston 204.1 and of the second piston 204.2 include sealings, so that chambers, which are separated from one another, are formed.

In particular, the seals are of such a nature that no liquid exchange takes place between the chambers.

In the shown embodiment, the end-face of the first piston 204.1 is identical to the end-face of the second piston 204.2. However, this is not a necessity for the functioning of the system shown in FIG. 10. In contrast, the two end-faces and possibly an extension of the first and second block part along the movement direction of the delectable element 204 can be different, so that the shown media transformer can also be operated as a pressure transformer and/or delivery rate transformer.

The first piston 204.1 subdivides the first block part 201 into a left chamber 201.1 and into a right chamber 201.2. The summed volume of the left and right chamber is constant, wherein however a movement of the first piston 204.1 can change the relative volume of the left and right chamber.

The second piston 204.2 subdivides the second block part 202 into a left chamber 202.1 and into a right chamber 202.2. The summed volume of the left and right chamber is constant, wherein however a movement of the second piston 204.2 can change the relative volume of the left and right chamber.

The maximal or minimal volume of the left and right chamber as a rule is different due to the piston connection 204.3

In the shown embodiment, the left chamber 201.1 of the first block part 201 corresponds to the first volume of a first media transformer of the double media transformer 80, the right chamber 202.2 of the second block part 202 to the second volume of the first media transformer, the right chamber 201.2 of the first block part 202 to the first volume of the second media transformer of the double media transformer 80 and the left chamber 202.1 of the second block part 202 to the second volume of the second media transformer.

In the embodiment according to FIG. 10, the first block part 201 is configured for the fluid (petrol) and the second block part 202 for the combustible (LPG).

The left and right chambers each include a feed conduit and a discharge conduit.

The feed conduit into the left chamber 201.1 and the feed conduit into the right chamber 201.2 of the first block part 201 are controlled by a first (common) chamber feed conduit valve 220 which is realised as a 3/2-way valve.

The first chamber feed conduit valve 220 is connected at the inlet side to a connection 210 to the outlet of the drive unit (high-pressure pump) and at the outlet side to the left and right chamber of the first block part 201.

The discharge conduit out of the left chamber 201.1 and the discharge conduit out of the right chamber 201.2 of the first block part 201 are controlled by a first (common) chamber discharge conduit valve 221 which is realised as a 3/2 way magnet valve.

The first chamber discharge conduit valve 221 is connected at the inlet side to the left and the right chamber of the first block part 201 and at the outlet side to a return 211 to the fluid reservoir.

The return of fluid out of the first block part 201 into the fluid reservoir is secured via a check valve 217. The check valve 217 has a holding pressure or opening pressure. In particular, it has an opening pressure, which lies above the boiling pressure of the fluid (for example petrol) at the theoretically reachable maximal temperature due to trapped heat, so that a boiling of the fluid in the media transformer is prevented.

If the fluid is petrol, then the opening pressure can be between for example 2 and 5 bar, in particular between 2.7 and 3.5 bar.

The occupation of the connections of the first chamber feed conduit valve 220 and of the first chamber discharge conduit valve 221 is consequently of a nature that the first piston 204.1 is movable in both directions along the axis of the piston connection 204.3 by way of an equally directed switching of these two valves.

Specifically, the occupation of the connections of the first chamber feed conduit valve 220 and of the first chamber discharge conduit valve 221, shown in FIG. 10, leads to the first chamber feed conduit valve 220 leading fluid into the right chamber 201.2 and the first chamber discharge-conduit valve 221 preventing a flow of fluid out of the right chamber and simultaneously permitting a flow of the fluid out of the left chamber 201.1, when both valves are not subjected to current. As a result, the first piston 204 is pressed in the direction of the left chamber 201.1.

With the shown occupation of the connections, a simultaneous subjection of the first chamber feed conduit valve 220 and of the first chamber discharge conduit valve 221 to current leads to the first chamber feed conduit valve 220 leading fluid into the left chamber 201.1 while the first chamber discharge conduit valve 221 permits a discharge of the fluid out of the right chamber 201.2, but prevents a discharge out of the left chamber 201.1. As a result, the first piston is pressed in the direction of the right chamber 201.2.

The feed conduit to the left chamber 202.1 and to the right chamber 202.2 of the second block part 202 as well as the respective discharge conduits each include a check valve (first feed-conduit-side check valve 222, second feed-conduit-side check valve 223, first discharge-conduit-side check valve 224, second discharge-conduit-side check valve 225).

In particular, these check valves are switched such that the combustible can exclusively get into the left chamber 202.1 via the one of the two feed conduits and into the right chamber 202.2 via the other of the two feed conduits. Furthermore, the combustible can flow out of the left chamber 202.1 exclusively via the one of the two discharge conduits and out of the right chamber 202.2 via the other of the two discharge conduits.

The inlets of the feed-conduit-side check valves (222, 223) are connected to a connection 214 to the combustible delivery pump and therefore to the combustible container.

The outlets of the discharge-conduit-side check valves (224, 225) are connected to a connection 215 to the injection system. Supplementarily, the outlets of the discharge-conduit-side check valves (224, 225) are connected to a combustible reservoir connection 213 via a return. A return of combustible into the fuel reservoir via the combustible reservoir connection 213 is controlled by a combustible backflow valve 208.

In the shown embodiment, the switching between the delivery of the combustible (LPG) and the delivery of the fluid (petrol) to the connection 215 to the injection system is again effected via a switch-over valve 207.

The switch-over valve 207 is realised as a 3/2 way magnet valve, which, at the inlet side, is connected to the connection (inlet) 210 to the outlet of the drive unit and, at the outlet side is connected to the first chamber feed conduit valve 220 and to the connection 215 to the injection system. In the shown embodiment, the switch-over valve 207, which is not subjected to current leads fluid to the connection 215 to the injection system.

The embodiment according to FIG. 10 further includes the following optional features that a system in any embodiment according to the second aspect of the invention can have individually or in combinations:

The embodiment, which is shown in FIG. 10, includes a combustible return conduit 231 to the combustible reservoir connection 213, the return conduit being designed as a cooling conduit. The combustible return conduit 231 is realised at least partly as a cooling bore 230, which is fed via a cooling nozzle 232, a return orifice and/or a pressure regulator.

The cooling bores 230 are located in the surrounding wall of the hydraulic block.

The embodiment, which is shown in FIG. 10, includes a system for the exchange of different fuels, which can be used for operation of an engine, which is to say a system according to the first aspect of the invention. What is shown is a connection 212 to the pressure accumulator, as well as the pressure accumulator valve 206, which is connected upstream of the pressure accumulator. The pressure accumulator valve 206 is connected at the inlet side to the connection 210 to the outlet of the drive unit (high-pressure pump) and to the inlet of the switch-over valve 207.

The fuel exchange in the injection system in the shown embodiment is consequently additionally controlled via the switch-over valve 207.

The embodiment, which is shown in FIG. 10, is further suitable for counteracting pressure downturns which occur on switching over the delivery direction, which is to say on switching from a delivery via the left chamber 202.1 of the second block part 202 to a delivery via the right chamber 202.2 of the second block part 202 and vice versa.

This can be realised, for example, by way of the first chamber feed conduit valve 220 and the first chamber discharge conduit valve 221 not operating completely synchronously, but on switching over being subjected to current for a moment such that the feed conduit as well as the discharge conduit of the one of the two chambers of the first block part 201 are closed and the feed conduit as well as the discharge conduit of the other of the two chambers are open.

In the case that the system includes the optional pressure accumulator according to the first aspect of the invention as is shown in FIG. 10 (connection 212 to the pressure accumulator and pressure accumulator valve 206 in FIG. 10), then the pressure downturns can also be counteracted by way of a brief opening of the pressure accumulator valve 206.

In the case that the drive unit is a (petrol) high-pressure pump, the switching of the first chamber feed conduit valve 220 and of the first chamber discharge conduit valve 221 is effected in dependence on the position of the (petrol) high-pressure pump (or of the camshaft) or on delivery or non-delivery of the fluid.

In the embodiment shown in FIG. 10, the system 200 further includes reed contacts 205. These are arranged on the first and second block part such that they activate when the first or the second piston are located in the end position, in particular at maximal deflection.

The switching of the first chamber feed conduit valve 220 and of the first chamber discharge conduit valve 221 is coupled directly or indirectly via the control to the activation of the reed contacts 205.

Figure 11:
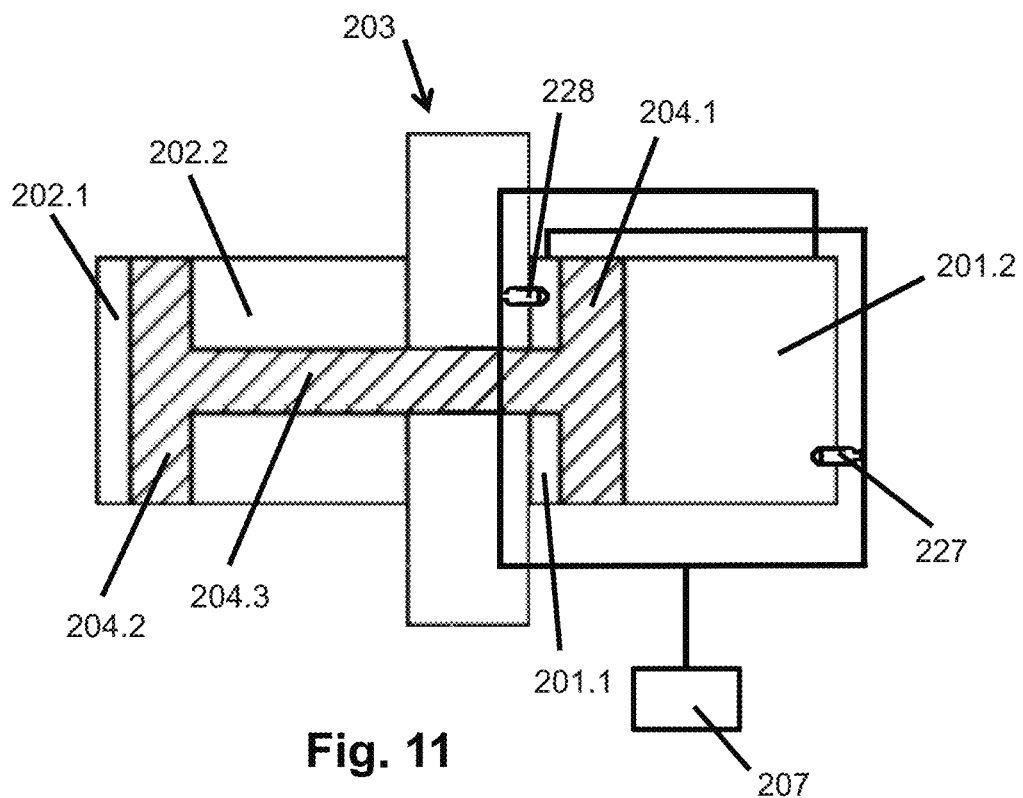
FIG. 11 shows a schematic representation of a system according to the second aspect of the invention, the system being hydraulically operated.

FIG. 11 schematically shows the feed of an embodiment of the system 200 according to the second aspect of the invention, the system being operated hydraulically and/or— depending on the specific embodiment—mechanically. A multitude of components which are necessary with an electronic operation can done away with on account of this.

It is particularly the electrically activated valves of the media transformer, such as for example the controllable valves (30, 30.1, 30.2), the feed-conduit-side control valves (55.1, 55.2), the first chamber feed conduit valve 220 and the chamber discharge conduit valve 221, and the reed contacts 205, which are mentioned in FIGS. 4-10 and which can be done away with.

In the embodiment which is shown in FIG. 11, the system includes a right valve 227 and a left valve 228, which are hydraulically and/or mechanically connected and are applied instead of the first chamber feed conduit valve 220 and the first chamber discharge conduit valve 221.

In particular, the right and the left valve can be arranged within the hydraulic block, in particular in the surrounding wall of the block.

The right and left valve are connected at the inlet side to the switch-over valve 207.

The right valve 227 controls the feed of fluid into the right chamber 201.2 of the first block part 201. The left valve 228 controls the feed of fluid into the left chamber 201.1 of the first block part 201.

The two valves switch in opposite directions, i.e. on operation, one of the two valves is opened and the other valve closed. An operation of the system 200, which is equivalent to the embodiment with the first chamber feed conduit valve 220 and the first chamber discharge conduit valve 221, is possible with this.

In particular, the switching takes space when the first piston 204.1 assumes a maximal deflection, which is defined, for example, by an end stop. In the shown embodiment, there are two maximal deflections of the first piston 204.1 on operation: a first maximal deflection is reached when the volume of the left chamber 201.1 is minimal and the volume of the right chamber 201.2 is maximal. A second maximal deflection is reached when the volume of the left chamber 201.1 is maximal and the volume of the right chamber 201.2 is minimal.

The state given a maximal deflection of the first piston 204.1 is shown in FIG. 11.

In particular, the switching of the valves can be activated by a dynamic pressure that occurs at the maximal deflection.

For example, the two valves can be biased or be biasable by a spring. The biased spring can close a bore that leads into the chamber. Accordingly, a relaxed spring can open the mentioned bore. A reverse configuration is also conceivable.

A mechanical switching, for example by way of the first piston 204.1 in the maximal deflection or shortly before the maximal deflection interacting with a mechanical lever is also possible, alternatively or supplementarily to a hydraulic switching which in particular is activated via the dynamic pressure.

In particular, a control current which is dependent on the state of the mechanical lever can define the state (open or closed) of the right valve 227 and of the left valve 228. For example, the control current can effect a transition of the spring from the relaxed into the biased state and vice versa.

Neither the hydraulic or mechanical switching of the media transformer nor the previously described measures for preventing pressure downturns are restricted to an embodiment of the system according to FIGS. 10 and 11. In contrast, both can be applied alone or in combination, in each embodiment of the system.

What is claimed is:

1. A system for use in a fuel facility of an engine and for the exchange of different fuels which are useable for operation of the engine,
   wherein the system, via a connection, is configured to be connected onto a high-pressure region of the fuel facility supplying the engine, said high-pressure region being arranged downstream of a fuel high-pressure pump, and/or onto an injection system of the engine,
   wherein the system comprises:
      a fuel exchange unit,
      a control, and
      an exchange return conduit,
   wherein the control is configured to discharge a second fuel out of the injection system via the exchange return conduit and the system is configured to deliver autonomously, given a switched-off engine, a first fuel at pressure from the fuel exchange unit into the injection system via the connection in order to replace the second fuel, which is located in the injection system, with the first fuel.

2. The system according to claim 1, wherein the fuel exchange unit comprises a pressure accumulator which is configured to store the first fuel at pressure.

3. The system according to claim 2, wherein the fuel exchange unit further comprises a pressure accumulator valve, which is arranged upstream of the pressure accumulator, and which can be switched between an open and a closed state by way of the control.

4. The system according to claim 3, wherein the pressure accumulator is fillable during the operation of the engine with the first fuel.

5. The system according to claim 1, wherein the fuel exchange unit comprises a boost pump which is activatable given a switched-off engine and which comprises a boost pump inlet for the feed of the first fuel and a boost pump outlet which is connected to the connection.

6. The system according to claim 5, wherein the fuel exchange unit further comprises a reservoir for the first fuel, said reservoir being connected to the boost pump inlet.

7. The system according to claim 5, wherein the fuel exchange unit further comprises a pressure accumulator which is arranged downstream of the boost pump and which is configured to store the first fuel at pressure.

8. The system according to claim 7, wherein the system is configured to increase the pressure of the first fuel, which is in the injection system and has flowed out of the boost pump outlet, by way of the first fuel being discharged under pressure out of the pressure accumulator.

9. The system according to claim 1, wherein the system is configured to discharge the second fuel out of the injection system into a storage container or into a second fuel container.

10. The system according to claim 9, wherein:
the system further comprises a return valve;
the exchange return conduit is connected at a first side to the injection system and can be connected at a second side to the second fuel container or to the storage container; and
the return valve is switchable between an open and a closed state by way of the control, in order to permit or prevent a discharge of the second fuel which is located in the injection system into the second fuel container or into the storage container.

11. The system according to claim 1, wherein the control is configured to firstly discharge the second fuel which is located in the injection system, before the first fuel which is stored in the fuel exchange unit is delivered into the injection system.

12. The system according to claim 1, wherein the system is configured to replace the second fuel which is located in the injection system, with the first fuel which is stored in the fuel exchange unit if at least one of the following conditions is fulfilled:
the engine is not in operation for a predefined time interval;
registration of a predefined temperature change in a region of the injection system after the engine has been switched off;
falling short of, or not reaching, a predefined temperature in the region of the injection system after the engine has been switched off.

13. A fuel facility comprising:
a first fuel container for a first fuel,
a second fuel container for a second fuel,
at least one fuel high-pressure pump, and
a conduit system,
wherein each fuel container is connected to a fuel high-pressure pump via the conduit system and the at least one fuel high-pressure pump is connected via the conduit system to an injection system of an engine, wherein the fuel facility comprises a system according to claim 1.

14. A method for replacing a second fuel located in an injection system of an engine by a first fuel, the method comprising the steps of:
discharging the second fuel out of the injection system via an exchange return conduit; and
delivering autonomously the first fuel at pressure from an exchange unit into the injection system;
wherein the first fuel is delivered via a connection and into at least one of a high-pressure region of a fuel facility of the engine, said high-pressure region being arranged downstream of a high-pressure pump, and the injection system, and
wherein the engine is switched off during the step of delivering autonomously the first fuel.

15. The method according to claim 14, wherein the fuel facility is switched off during the step of delivering autonomously the first fuel.

16. The method according to claim 14, wherein the step of discharging the second fuel is carried out prior to the step of delivering autonomously the first fuel.

17. The method according to claim 14, wherein in the step of delivering autonomously the first fuel, the first fuel is delivered at a pressure in the range of an operating pressure of the engine.

18. The method according to claim 14, wherein the second fuel is replaced by the first fuel if at least one of the following conditions is fulfilled:
the engine is not in operation for a predefined time interval;
registration of a predefined temperature change in the region of the injection system after the engine has been switched off;
falling short of, or not reaching, a predefined temperature in the region of the injection system after the engine has been switched off.

19. The method according to claim 14, wherein:
the exchange unit is filled with the first fuel during operation of the engine,
a filling of the exchange unit with the first fuel is carried out in a continuous manner, and
the exchanged unit is emptied in an abrupt manner during the step of delivering autonomously the first fuel.

* * * * *